(12) United States Patent
Bates

(10) Patent No.: US 11,775,160 B2
(45) Date of Patent: Oct. 3, 2023

(54) LOCATION BASED PLAYBACK SYSTEM CONTROL

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 453 days.

(21) Appl. No.: 16/819,737

(22) Filed: Mar. 16, 2020

(65) Prior Publication Data

US 2020/0348830 A1  Nov. 5, 2020

Related U.S. Application Data

(63) Continuation of application No. 15/999,715, filed on Aug. 20, 2018, now Pat. No. 10,592,086, which is a
(Continued)

(51) Int. Cl.
*G06F 3/04847* (2022.01)
*G06F 3/04842* (2022.01)
(Continued)

(52) U.S. Cl.
CPC ......... *G06F 3/04847* (2013.01); *G05B 19/05* (2013.01); *G06F 3/04817* (2013.01);
(Continued)

(58) Field of Classification Search
USPC ........................................................ 715/717
See application file for complete search history.

(56) References Cited

U.S. PATENT DOCUMENTS 5,440,644 A  8/1995 Farinelli et al.
5,761,320 A  6/1998 Farinelli et al.
(Continued)

FOREIGN PATENT DOCUMENTS

EP  1389853 A1  2/2004
EP  1612999 A1  1/2006
(Continued)

OTHER PUBLICATIONS

Advisory Action dated Nov. 1, 2017, issued in connection with U.S. Appl. No. 14/475,191, filed Sep. 2, 2014, 4 pages.
(Continued)

*Primary Examiner* — Matthew Ell
*Assistant Examiner* — Conrad R Pack
(74) *Attorney, Agent, or Firm* — Fortem IP LLP; Benjamin Urban

(57) ABSTRACT

Example implementations may involve using a prompt to prevent inadvertent control or playback of audio content. When a mobile device receives input data indicating a command to play back audio content on a first playback device, the mobile device determines whether the mobile device is in proximity to the first playback device. If the mobile device determines that the mobile device within a given proximity to the first playback device, the mobile device transmits, via the network interface, one or more commands to instruct the first playback device to play back the audio content. However, if the mobile device determines that the mobile device outside the proximity, the mobile device displays a prompt indicating that the mobile device is the outside the given proximity to the first playback device and a selectable control that, when selected, transmits the one or more commands to play back the audio content.

20 Claims, 12 Drawing Sheets

Related U.S. Application Data continuation of application No. 14/681,735, filed on Apr. 8, 2015, now Pat. No. 10,055,108.

(51) Int. Cl.

| | |
|---|---|
| *H04R 3/12* | (2006.01) |
| *G11B 19/02* | (2006.01) |
| *H04N 21/432* | (2011.01) |
| *H04N 21/436* | (2011.01) |
| *H04N 21/472* | (2011.01) |
| *H04N 21/485* | (2011.01) |
| *H04N 21/81* | (2011.01) |
| *H04L 41/0893* | (2022.01) |
| *H04N 21/47* | (2011.01) |
| *H04N 21/2387* | (2011.01) |
| *H04N 21/439* | (2011.01) |
| *H04W 4/80* | (2018.01) |
| *H04N 21/482* | (2011.01) |
| *H04N 21/43* | (2011.01) |
| *H04N 21/2368* | (2011.01) |
| *G11B 27/34* | (2006.01) |
| *G05B 19/05* | (2006.01) |
| *G06F 3/04817* | (2022.01) |
| *G06F 3/16* | (2006.01) |

(52) U.S. Cl.
CPC .......... *G06F 3/04842* (2013.01); *G06F 3/165* (2013.01); *G11B 19/025* (2013.01); *G11B 27/34* (2013.01); *H04L 41/0893* (2013.01); *H04N 21/2368* (2013.01); *H04N 21/2387* (2013.01); *H04N 21/439* (2013.01); *H04N 21/4325* (2013.01); *H04N 21/43076* (2020.08); *H04N 21/43615* (2013.01); *H04N 21/47* (2013.01); *H04N 21/47217* (2013.01); *H04N 21/485* (2013.01); *H04N 21/4825* (2013.01); *H04N 21/8113* (2013.01); *H04R 3/12* (2013.01); *H04W 4/80* (2018.02); *G05B 2219/13135* (2013.01); *G05B 2219/13144* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,438,456 | B1 | 8/2002 | Feddema et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,392,102 | B2 | 6/2008 | Sullivan et al. |
| 7,483,538 | B2 | 1/2009 | McCarty et al. |
| 7,509,131 | B2 | 3/2009 | Krumm et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,290,603 | B1 | 10/2012 | Lambourne |
| 8,483,853 | B1 | 7/2013 | Lambourne |
| 8,515,413 | B1 | 8/2013 | Schilit et al. |
| 8,565,791 | B1 | 10/2013 | Schilit et al. |
| 8,942,252 | B2 | 1/2015 | Balassanian et al. |
| 9,084,003 | B1 | 7/2015 | Sanio et al. |
| 9,185,134 | B1 | 11/2015 | Story, Jr. et al. |
| 9,277,044 | B2 | 3/2016 | Kahn et al. |
| 9,319,149 | B2 | 4/2016 | Luna et al. |
| 9,516,440 | B2 | 12/2016 | Jarvis et al. |
| 9,654,821 | B2 | 5/2017 | Coburn, IV et al. |
| 9,720,576 | B2 | 8/2017 | Kumar et al. |
| 9,727,219 | B2 | 8/2017 | Kumar et al. |
| 10,055,108 | B2 | 8/2018 | Bates |
| 10,268,357 | B2 | 4/2019 | Vega et al. |
| 10,275,138 | B2 | 4/2019 | Vega et al. |
| 10,592,086 | B2 | 3/2020 | Bates |
| 10,621,310 | B2 | 4/2020 | Beckhardt |
| 10,645,130 | B2 | 5/2020 | Corbin et al. |
| 10,715,973 | B2 | 7/2020 | Kumar et al. |
| 10,761,710 | B2 | 9/2020 | Vega et al. |
| 10,775,973 | B2 | 9/2020 | Kumar et al. |
| 10,791,405 | B2 | 9/2020 | Wilberding et al. |
| 10,791,407 | B2 | 9/2020 | Oishi et al. |
| 10,841,719 | B2 | 11/2020 | Hartung |
| 10,848,892 | B2 | 11/2020 | Sheen |
| 10,873,612 | B2 | 12/2020 | Lang |
| 10,880,664 | B2 | 12/2020 | Jarvis et al. |
| 10,884,698 | B2 | 1/2021 | Hartung et al. |
| 10,945,089 | B2 | 3/2021 | Reilly et al. |
| 11,006,232 | B2 | 5/2021 | Hartung et al. |
| 11,051,048 | B2 | 6/2021 | Coburn, IV et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0173273 | A1* | 11/2002 | Spurgat ............ H04N 21/41265 455/66.1 |
| 2003/0157951 | A1 | 8/2003 | Hasty |
| 2003/0228846 | A1 | 12/2003 | Berliner et al. |
| 2004/0024478 | A1 | 2/2004 | Hans et al. |
| 2005/0246663 | A1 | 11/2005 | Yeung et al. |
| 2007/0087686 | A1* | 4/2007 | Holm ........................ H04S 7/30 455/3.06 |
| 2007/0135087 | A1 | 6/2007 | Villevieille et al. |
| 2007/0142024 | A1 | 6/2007 | Clayton et al. |
| 2007/0142944 | A1 | 6/2007 | Goldberg et al. |
| 2007/0299737 | A1 | 12/2007 | Plastina et al. |
| 2008/0109852 | A1 | 5/2008 | Kretz et al. |
| 2008/0152165 | A1* | 6/2008 | Zacchi ..................... H04R 5/04 381/77 |
| 2010/0054275 | A1 | 3/2010 | Noonan et al. |
| 2010/0260348 | A1 | 10/2010 | Bhow et al. |
| 2010/0299639 | A1 | 11/2010 | Ramsay et al. |
| 2010/0318911 | A1 | 12/2010 | Holladay et al. |
| 2011/0066943 | A1 | 3/2011 | Brillon et al. |
| 2012/0082424 | A1* | 4/2012 | Hubner ................ H04N 21/242 386/E5.032 |
| 2012/0115503 | A1 | 5/2012 | Lynch et al. |
| 2012/0117585 | A1 | 5/2012 | Curtis et al. |
| 2013/0076651 | A1 | 3/2013 | Reimann et al. |
| 2013/0080955 | A1 | 3/2013 | Reimann et al. |
| 2013/0094667 | A1 | 4/2013 | Millington et al. |
| 2013/0097290 | A1 | 4/2013 | Millington |
| 2013/0111347 | A1 | 5/2013 | Reilly et al. |
| 2013/0163783 | A1 | 6/2013 | Burlingame et al. |
| 2013/0170363 | A1 | 7/2013 | Millington et al. |
| 2013/0170647 | A1 | 7/2013 | Reilly et al. |
| 2013/0173761 | A1 | 7/2013 | Griffiths et al. |
| 2013/0173794 | A1 | 7/2013 | Agerbak et al. |
| 2013/0237156 | A1 | 9/2013 | Jung et al. |
| 2013/0243199 | A1* | 9/2013 | Kallai ..................... H04R 27/00 381/17 |
| 2013/0251329 | A1 | 9/2013 | McCoy et al. |
| 2013/0317635 | A1 | 11/2013 | Bates et al. |
| 2014/0003629 | A1 | 1/2014 | Reilly et al. |

(56) References Cited

U.S. PATENT DOCUMENTS

| | | | |
|---|---|---|---|
| 2014/0046464 A1* | 2/2014 | Reimann | G06F 3/167 700/94 |
| 2014/0086549 A1* | 3/2014 | Davidson | H04N 21/44218 386/E5.032 |
| 2014/0087770 A1 | 3/2014 | Cho et al. | |
| 2014/0093085 A1 | 4/2014 | Jarvis et al. | |
| 2014/0169569 A1 | 6/2014 | Toivanen et al. | |
| 2014/0181654 A1 | 6/2014 | Kumar et al. | |
| 2014/0201635 A1* | 7/2014 | Kumar | G11B 19/025 715/716 |
| 2014/0235265 A1 | 8/2014 | Slupik et al. | |
| 2014/0267002 A1 | 9/2014 | Luna et al. | |
| 2014/0267148 A1 | 9/2014 | Luna et al. | |
| 2014/0269531 A1 | 9/2014 | Luna et al. | |
| 2014/0273859 A1* | 9/2014 | Luna | H04M 1/72454 455/41.3 |
| 2014/0274185 A1 | 9/2014 | Luna et al. | |
| 2014/0279889 A1 | 9/2014 | Luna et al. | |
| 2014/0280450 A1 | 9/2014 | Luna | |
| 2014/0324203 A1 | 10/2014 | Coburn, IV et al. | |
| 2014/0342660 A1 | 11/2014 | Fullam et al. | |
| 2014/0347565 A1 | 11/2014 | Fullam et al. | |
| 2014/0354441 A1 | 12/2014 | Luna et al. | |
| 2014/0364056 A1* | 12/2014 | Belk | H04W 4/00 455/41.1 |
| 2015/0172878 A1 | 6/2015 | Luna et al. | |
| 2015/0189461 A1 | 7/2015 | Pang et al. | |
| 2015/0256954 A1* | 9/2015 | Carlsson | H04R 3/12 381/59 |
| 2015/0286360 A1 | 10/2015 | Wachter | |
| 2015/0371529 A1 | 12/2015 | Dolecki | |
| 2015/0381740 A1 | 12/2015 | Gwin et al. | |
| 2016/0005003 A1 | 1/2016 | Norris et al. | |
| 2016/0026429 A1 | 1/2016 | Triplett | |
| 2016/0062606 A1 | 3/2016 | Vega et al. | |
| 2016/0246568 A1 | 8/2016 | Vega et al. | |
| 2016/0299669 A1 | 10/2016 | Bates | |
| 2019/0012069 A1 | 1/2019 | Bates | |
| 2019/0243534 A1 | 8/2019 | Vega et al. | |
| 2020/0348830 A1 | 11/2020 | Bates | |

FOREIGN PATENT DOCUMENTS

| | | |
|---|---|---|
| WO | 200153994 | 7/2001 |
| WO | 2003093950 A2 | 11/2003 |
| WO | 2005013047 A2 | 2/2005 |
| WO | 2007041284 A2 | 4/2007 |
| WO | 2008042458 A2 | 4/2008 |
| WO | 2011156783 A2 | 12/2011 |
| WO | 2014074089 A1 | 5/2014 |

OTHER PUBLICATIONS

Advisory Action dated Feb. 27, 2017, issued in connection with U.S. Appl. No. 14/475,191, filed Sep. 2, 2014, 6 pages.
Advisory Action dated Aug. 6, 2018, issued in connection with U.S. Appl. No. 14/475,191, filed Sep. 2, 2014, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Jan. 27, 2016, issued in connection with European Application No. 15002585.6-1905, 9 pages.

European Patent Office, European Office Action dated Mar. 16, 2020, issued in connection with European Application No. 18204767.0, 5 pages.
European Patent Office, European Office Action dated Jan. 23, 2020, issued in connection with European Application No. 16717765.8, 9 pages.
European Patent Office, European Search Report dated Apr. 17, 2019, issued in connection with European Application No. 18204767.0, 13 pages.
European Patent Office, Office Action dated May 23, 2017, issued in connection with European Application No. 15002585.6, 8 pages.
European Patent Office, Office Action dated Nov. 25, 2016, issued in connection with European Application No. 15002585.6-1905, 7 pages.
Final Office Action dated Dec. 15, 2016, issued in connection with U.S. Appl. No. 14/475,191, filed Sep. 2, 2014, 16 pages.
Final Office Action dated Apr. 20, 2018, issued in connection with U.S. Appl. No. 14/475,191, filed Sep. 2, 2014, 12 pages.
Final Office Action dated Aug. 24, 2017, issued in connection with U.S. Appl. No. 14/475,191, filed Sep. 2, 2014, 18 pages.
First Action Interview dated Nov. 1, 2017, issued in connection with U.S. Appl. No. 14/681,735, filed Apr. 8, 2015, 5 pages.
International Searching Authority, International Preliminary Report on Patentability dated Oct. 10, 2017, issued in connection with International Application No. PCT/US2016/026511 filed on Apr. 7, 2016, 9 pages.
International Searching Authority, International Search Report and Written Opinion dated Aug. 2, 2016, issued in connection with International Application No. PCT/US2016/026511, filed on Apr. 7, 2016, 14 pages.
International Searching Authority, International Search Report and Written Opinion dated Jan. 4, 2016, issued in connection with International Application No. PCT/US2015/048171, filed Sep. 2, 2015, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 10, 2017, issued in connection with U.S. Appl. No. 14/475,191, filed Sep. 2, 2014, 16 pages.
Non-Final Office Action dated Dec. 14, 2017, issued in connection with U.S. Appl. No. 14/475,191, filed Sep. 2, 2014, 12 pages.
Non-Final Office Action dated May 18, 2018, issued in connection with U.S. Appl. No. 15/147,322, filed May 5, 2016, 11 pages.
Notice of Allowance dated Nov. 7, 2019, issued in connection with U.S. Appl. No. 15/999,715, filed Aug. 20, 2018, 9 pages.
Notice of Allowance dated Apr. 19, 2018, issued in connection with U.S. Appl. No. 14/681,735, filed Apr. 8, 2015, 7 pages.
Notice of Allowance dated Apr. 27, 2020, issued in connection with U.S. Appl. No. 16/383,842, filed Apr. 15, 2019, 15 pages.
Notice of Allowance dated Dec. 27, 2018, issued in connection with U.S. Appl. No. 15/147,322, filed May 5, 2016, 18 pages.
Notice of Allowance dated Dec. 6, 2018, issued in connection with U.S. Appl. No. 14/475,191, filed Sep. 2, 2014, 11 pages.
Palm, Inc., "Handbook for the Palm VII Handheld," May 2000, 311 pages.
Preinterview First Office Action dated Aug. 14, 2017, issued in connection with U.S. Appl. No. 14/681,735, filed Apr. 8, 2015, 5 pages.
Preinterview First Office Action dated Oct. 19, 2016, issued in connection with U.S. Appl. No. 14/475,191, filed Sep. 2, 2014, 5 pages.
Presentations at WinHEC 2000, May 2000, 138 pages.
Sonos Controller App for iPad Product Guide, Sonos, Inc., Nov. 2014, 47 pages.
U.S. Appl. No. 60/490,768, filed Jul. 28, 2003, entitled "Method for synchronizing audio playback between multiple networked devices," 13 pages.

(56) References Cited

OTHER PUBLICATIONS

U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
European Patent Office, European Search Report dated Feb. 15, 2022, issued in connection with European Application No. 21189588. 3, 6 pages.
European Patent Office, European Search Report dated Oct. 20, 2021, issued in connection with European Application No. 21158566. 6, 16 pages.
European Patent Office, European Search Report dated Jan. 24, 2022, issued in connection with European Application No. 21158566. 6, 15 pages.
Notice of Allowance dated Aug. 18, 2021, issued in connection with U.S. Appl. No. 17/005,950, filed Aug. 28, 2020, 24 pages.

* cited by examiner

LOCATION BASED PLAYBACK SYSTEM CONTROL

CROSS REFERENCE TO RELATED APPLICATIONS

This application claims priority under 35 U.S.C. § 120 to, and is a continuation of, U.S. non-provisional application Ser. No. 15/999,715 filed on Aug. 20, 2018, entitled "Location Based Playback System Control," which is incorporated herein by reference in its entirety.

U.S. non-provisional application Ser. No. 15/999,715 claims priority under 35 U.S.C. § 120 to, and is a continuation of, U.S. non-provisional application Ser. No. 14/681,735 filed on Apr. 8, 2015, entitled "Location Based Playback System Control," and issued as U.S. Pat. No. 10,055,108 on Aug. 21, 2018, which is incorporated herein by reference in its entirety.

This application is related to U.S. patent application Ser. No. 14/475,191 filed Sep. 2, 2014, entitled "Zone Recognition," which is incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
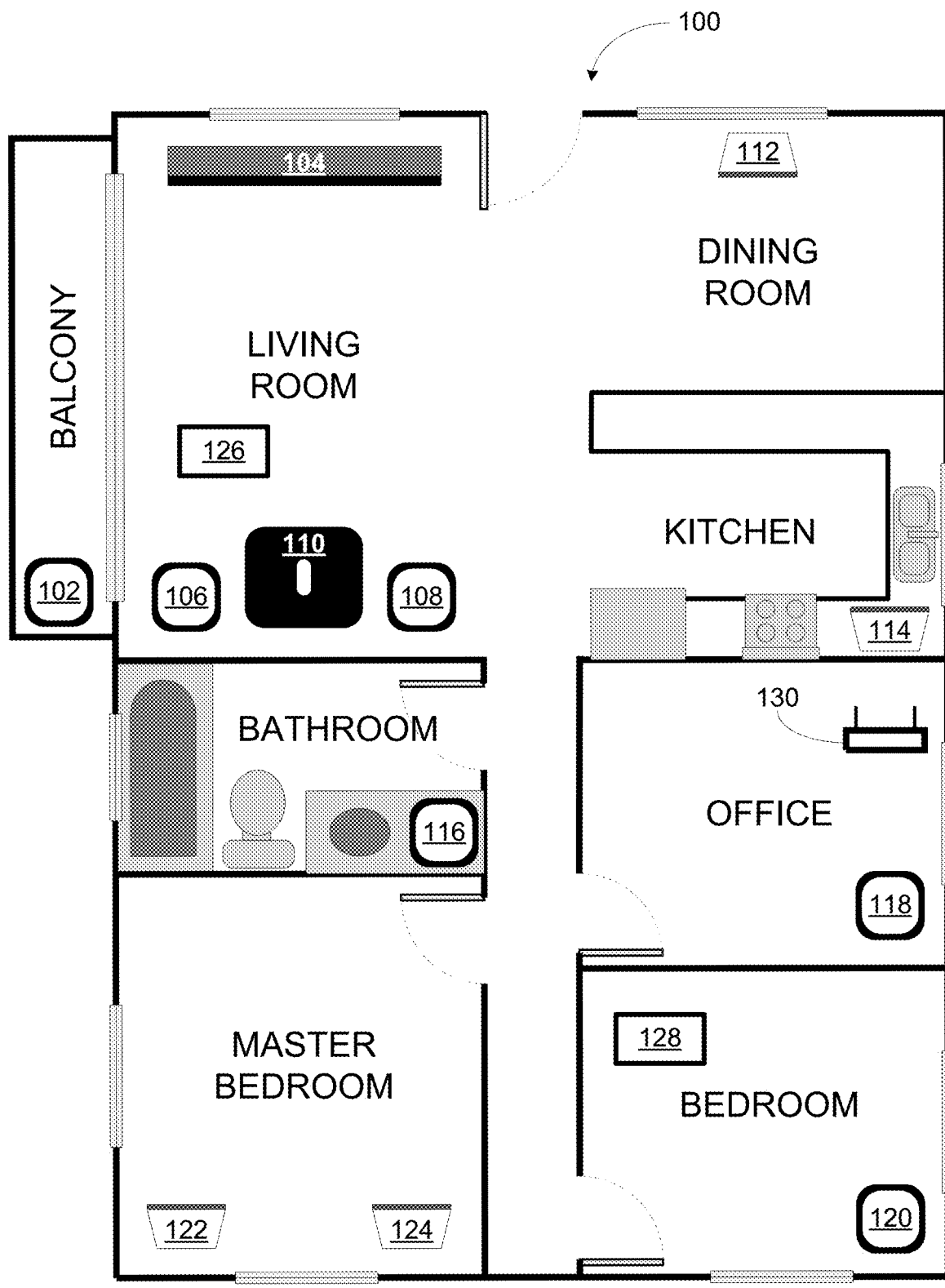
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, location based system control. An example media playback system may be divided into one or more zones, each zone including one or more playback devices. In some example implementations, playback devices of respective zones may be physically located in respective locations, such as in the different rooms of a house. For example, a media playback system may include a living room zone, a dining room zone, a kitchen zone, an office zone, and/or a bedroom zone, in which playback devices of the different zones are located in the living room, dining room, kitchen, office, and/or bedroom, respectively.

In one arrangement, one or more devices communicatively coupled to the media playback system may have respective graphical interfaces (e.g., a touchscreen display of a tablet, smartphone, or wearable device). Such a graphical interface may display a control interface of a particular zone and be referred to as a "control device." The control interface may include contextual information about a particular zone, such as the name of the zone and/or media content presenting playing on the playback device(s) of the zone. The control interface may also include playback controls (e.g., transport controls such as play, pause, or skip track) for controlling media content playback in the zone. The graphical display may also display other information about the media playback system or one of the zones, perhaps in respective control interfaces (e.g., a first control interface for a kitchen zone and a second control interface for a living room zone).

An example media playback system may maintain an awareness of where the control device is located relative to the zones of a media playback system. Such location-based awareness may improve the user experience, as the media playback system can adjust its operation based on the control device being located in proximity to a given zone. For instance, the graphical interface of the control device may transition from displaying a control interface of a first zone (e.g., a living room zone) to displaying a control interface of a second zone (e.g., a bedroom zone) based on the media playback system detecting that the control device is in proximity to the second zone. Such a feature may improve the user experience, as the control device may be adjusted to the relevant zone. As another example, playback may shift from zone to zone as media playback system detects movement of the control device between zones, such that playback appears to follow the control device from zone to zone.

One approach to maintaining location awareness may involve detecting input that selects a particular one of the multiple zones. For instance, a user may move from a first area in which a first zone is located (e.g., the kitchen zone) into a second area in which a second zone is located (e.g., the living room zone) and then select the second zone on the control device. The control device may detect such input and update its location awareness to indicate that the control device is now within the second zone.

In a second approach, the media playback system maintains location awareness automatically. For instance, communication between the control device and the one or more playback devices of the media playback system may be used to determine that the device is within a given proximity to a particular zone of the media playback system. Some radio interfaces are configured to transmit with relatively low power, and accordingly operate with a relatively short range compared to some other communication interfaces and protocols. Transmitting between the device and a playback device via such a relatively short-range interface may indicate that the device and playback device are within a given proximity. While the transmission range of a given radio interface may vary based on environmental conditions and other factors, successful transmissions may be used to approximate the relative positioning of the control device and the playback device, such that the control device may be considered to be within a zone that includes the playback device given successful transmission between the control device and playback device. Based on such location awareness, the media playback system may adjust its operation according to the current positioning of the control device(s) (e.g., by displaying a different control interface or by adjusting playback).

However, such an approach may cause some uncertainty as to which particular zone that the control device is within. Rooms of a home may naturally divide a media playback system into zones, however, the walls of the home might not always separate the zones from the perspective of the radio interfaces. For instance, playback devices of two zones might be separated by a wall, but be positioned such that a control device can successfully communicate with playback devices of two zones, which may result in uncertainty within the media playback system as to which zone the control device is within. As another example, certain surfaces may reflect radio transmissions and thereby alter the expected transmission range of the radio interfaces, which may cause false positive determinations that a control device is within proximity to a given zone. Further, some objects may attenuate radio transmissions, which may cause a failure of the media playback system to detect that a control device is within proximity to a given zone.

In some cases, such conditions may cause the media playback system to incorrectly determine that a control device is in proximity to a particular zone. Automatic adjustment of the media playback system in response to the control device being in proximity to the particular zone may degrade the user experience. For instance, the media playback system may determine that the control device is in a living room zone when the control device is actually in the kitchen zone. When the user looks at the graphical interface of the control device, she might see the control interface of the living room zone instead of the expected control interface of the kitchen zone. As another example, as the control device is moved down a hallway past the bedroom zone towards the living room zone, the media playback system may incorrectly detect that the control device is within the bedroom zone and responsively begin playback in that zone. However, this playback may wake a sleeping baby in the bedroom zone. In such circumstances, the location-based features of the media playback system might not be considered to enhance the user experience. In some cases, techniques disclosed herein may enhance the location-based control of a media playback system, perhaps by mitigating some of the circumstances noted above.

Some techniques may involve displaying a notification that the control device is outside of a zone that is presently under control by the control device. For instance, a control device may display a control interface of a first zone (e.g., a living room zone), perhaps based on detecting input that indicates a command to display that control interface. The control device may determine that the control device is outside of the first zone (e.g., outside of a threshold proximity to), perhaps using one of the location-awareness techniques noted above. If the control device is actually outside of the first zone, control of the first zone with the control device may have unintended results (e.g., initiating playback in a room that the user of the control device is not in). Displaying an indication that the control device is outside of the threshold proximity to the first zone (perhaps with an indication that the first zone is under control of the control device) may help to avoid such unintended results.

Further example techniques may involve verifying certain commands to control the media playback system prior to carrying out those commands on the media playback system. For example, a control device may receive input data indicating a command to initiate control of a first zone of a media playback system. Within examples, the command to initiate control of the first zone might be a command to display a control interface of the first zone or a command to initiate playback in the first zone, among other possibilities.

Before initiating control of the first zone, the control device may determine that the control device is within a second zone and display a selectable control that, when selected, initiates control of the first zone. For instance, a control device of a media playback system may receive input data indicating a command to initiate control of a bedroom zone. However, since the control device is within the living room zone, the control device may display a prompt with a selectable control requesting verification of the command to initiate control of the bedroom zone (rather than the living room zone). While including additional user interface interaction to perform an operation may in some way appear to be an increased burden, verifying certain operations may in fact enhance user experience as some undesirable circumstances may be avoided or mitigated.

In some example media playback systems, zones of the media playback system may be grouped together. As a group, the zones may perform joint operations, such as a playing back media in synchrony. Within examples, a media playback system may use its location awareness to facilitate zone grouping.

For instance, a control device may initiate playback of media in a first zone (e.g., a kitchen zone). The control device may then enter a second zone (e.g., a living room zone). In some embodiments, the media playback system may detect that the control device is in proximity to the second zone and responsively facilitate joining the first zone and the second zone into a zone group. For instance, the media playback system may display a selectable control that, when selected, cause the kitchen zone and the living room zone to join into a zone group. Alternatively, the media playback system may group the kitchen zone and the living room zone (without further input). After grouping, the kitchen zone and the living room zone may play the media in synchrony.

As indicated above, example techniques may involve displaying a notification that the control device is outside of a zone that is presently under control by the control device. In one aspect, a method is provided. The method may involve displaying a control interface that is associated with a first zone of the media playback system, where the first zone comprises one or more first playback devices; and where the media playback system further includes a second zone that comprises one or more second playback devices. The method may also involve determining that the device is outside of a threshold proximity to the first zone. The method may further involve displaying (i) an indication that the first zone is under control of the device, and (ii) an indication that the device is outside of the threshold proximity to the first zone.

In another aspect, a device is provided. The device includes a network interface, at least one processor, a data storage, and program logic stored in the data storage and executable by the at least one processor to perform functions. The functions may include displaying a control interface that is associated with a first zone of the media playback system, where the first zone comprises one or more first playback devices; and where the media playback system further includes a second zone that comprises one or more second playback devices. The functions may also include determining that the device is outside of a threshold proximity to the first zone. The functions may further include displaying (i) an indication that the first zone is under control of the device, and (ii) an indication that the device is outside of the threshold proximity to the first zone.

In yet another aspect, a non-transitory computer readable memory is provided. The non-transitory computer readable memory has stored thereon instructions executable by a computing device to cause the computing device to perform functions. The functions may include displaying a control interface that is associated with a first zone of the media playback system, where the first zone comprises one or more first playback devices; and where the media playback system further includes a second zone that comprises one or more second playback devices. The functions may also include determining that the device is outside of a threshold proximity to the first zone. The functions may further include displaying (i) an indication that the first zone is under control of the device, and (ii) an indication that the device is outside of the threshold proximity to the first zone.

Also as indicated above, further example techniques may involve verifying certain commands to control the media playback system prior to carrying out those commands on the media playback system. In one aspect, a method is provided. The method may involve receiving input data indicating a command to initiate control of a first zone of a media playback system, where the first zone comprises one or more first playback devices, and where the media playback system further includes a second zone that comprises one or more second playback devices. Before initiating control of the first zone, the method may involve determining that the control device is within a threshold proximity to the second zone. The method may further involve causing a graphical interface to display a selectable control that, when selected, initiates control of the first zone.

In another aspect, a device is provided. The device includes a network interface, at least one processor, a data storage, and program logic stored in the data storage and executable by the at least one processor to perform functions. The functions may include receiving input data indicating a command to initiate control of a first zone of a media playback system, where the first zone comprises one or more first playback devices, and where the media playback system further includes a second zone that comprises one or more second playback devices. The functions may also include, before initiating control of the first zone, determining that the control device is within a threshold proximity to the second zone. The functions may further include causing a graphical interface to display a selectable control that, when selected, initiates control of the first zone.

In yet another aspect, a non-transitory computer readable memory is provided. The non-transitory computer readable memory has stored thereon instructions executable by a computing device to cause the computing device to perform functions. The functions may include receiving input data indicating a command to initiate control of a first zone of a media playback system, where the first zone comprises one or more first playback devices, and where the media playback system further includes a second zone that comprises one or more second playback devices. The functions may also include, before initiating control of the first zone, determining that the control device is within a threshold proximity to the second zone. The functions may further include causing a graphical interface to display a selectable control that, when selected, initiates control of the first zone.

As further indicated above, example techniques may involve facilitating the grouping of a first zone and a second zone of a media playback system. In one aspect, a method is provided. The method may involve initiating playback in a first zone of a media playback system, wherein the first zone comprises one or more first playback devices. After initiating playback in the first zone, the method may involve determining that the control device is within a threshold proximity to at least one of one or more second playback devices of a second zone of the media playback system. After determining that the control device is within the threshold proximity to at least one of one or more second playback devices, the method may include joining the first zone and the second zone into a zone group in which the one or more first playback devices of the first zone and the one or more second playback devices of the second zone are configured to play back in synchrony.

In another aspect, a device is provided. The device includes a network interface, at least one processor, a data storage, and program logic stored in the data storage and executable by the at least one processor to perform functions. The functions may include initiating playback in a first zone of a media playback system, wherein the first zone comprises one or more first playback devices. After initiating playback in the first zone, the functions may include determining that the control device is within a threshold proximity to at least one of one or more second playback devices of a second zone of the media playback system. After determining that the control device is within the threshold proximity to at least one of one or more second playback devices, the functions may include joining the first zone and the second zone into a zone group in which the one or more first playback devices of the first zone and the one or more second playback devices of the second zone are configured to play back in synchrony.

In yet another aspect, a non-transitory computer readable memory is provided. The non-transitory computer readable memory has stored thereon instructions executable by a computing device to cause the computing device to perform functions. The functions may include initiating playback in a first zone of a media playback system, wherein the first zone comprises one or more first playback devices. After initiating playback in the first zone, the functions may include determining that the control device is within a threshold proximity to at least one of one or more second playback devices of a second zone of the media playback system. After determining that the control device is within the threshold proximity to at least one of one or more second playback devices, the functions may include joining the first zone and the second zone into a zone group in which the one or more first playback devices of the first zone and the one or more second playback devices of the second zone are configured to play back in synchrony.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
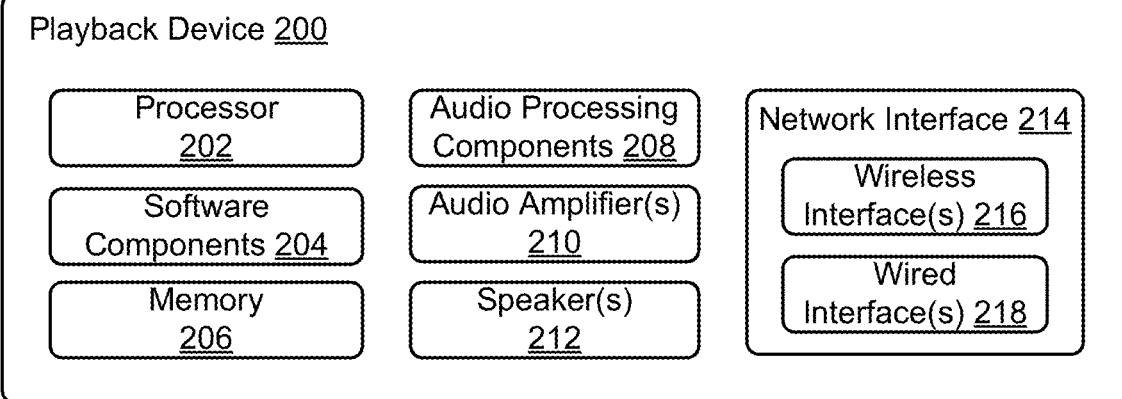
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
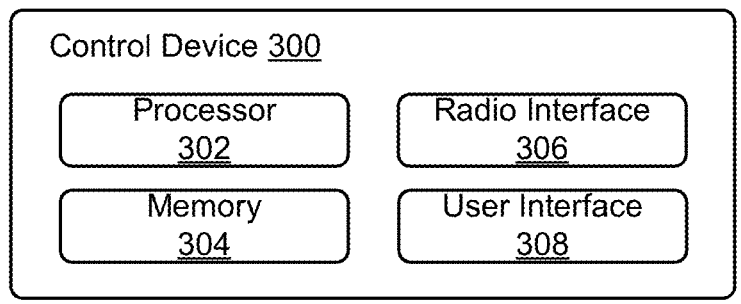
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
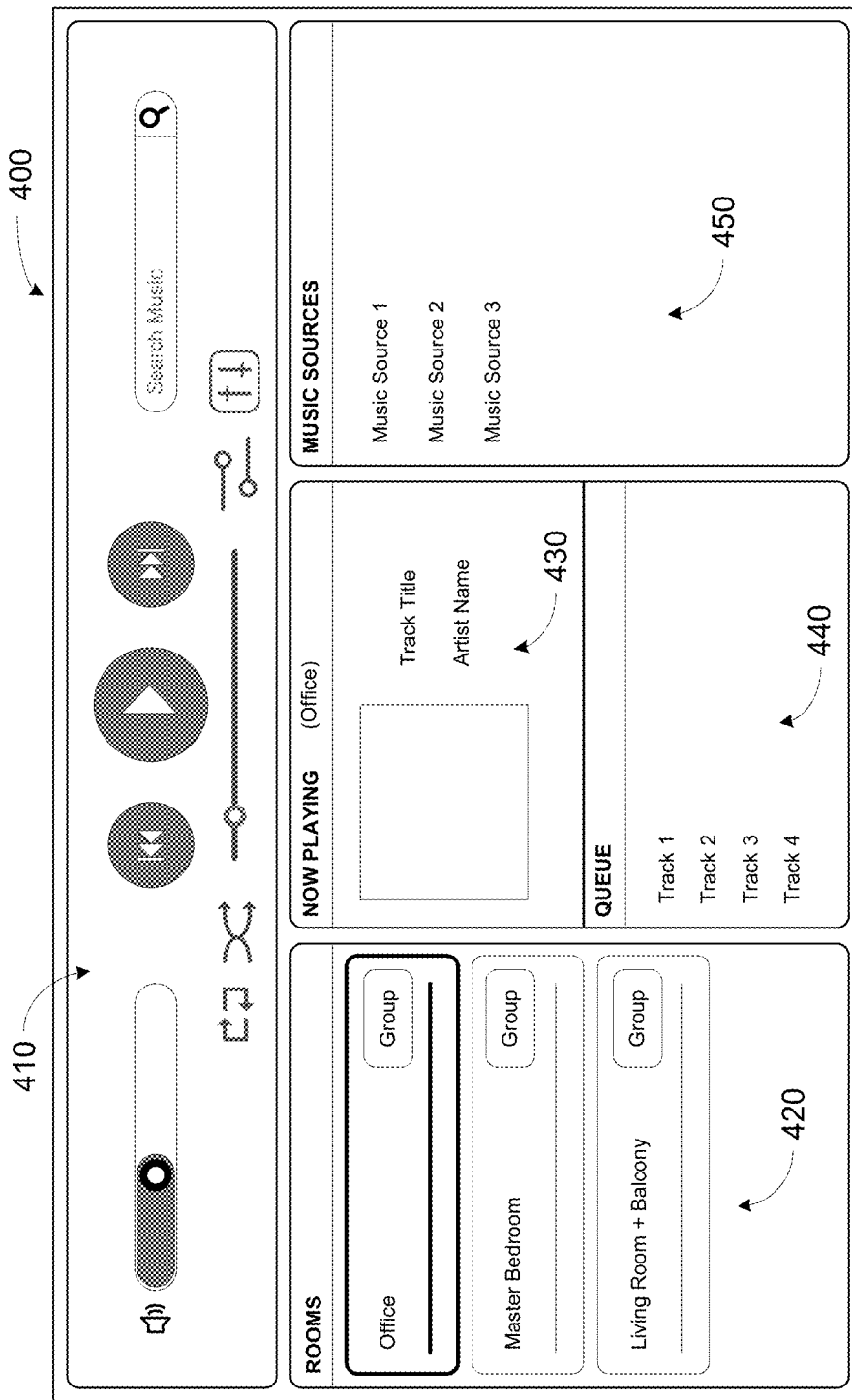
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or reassociated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
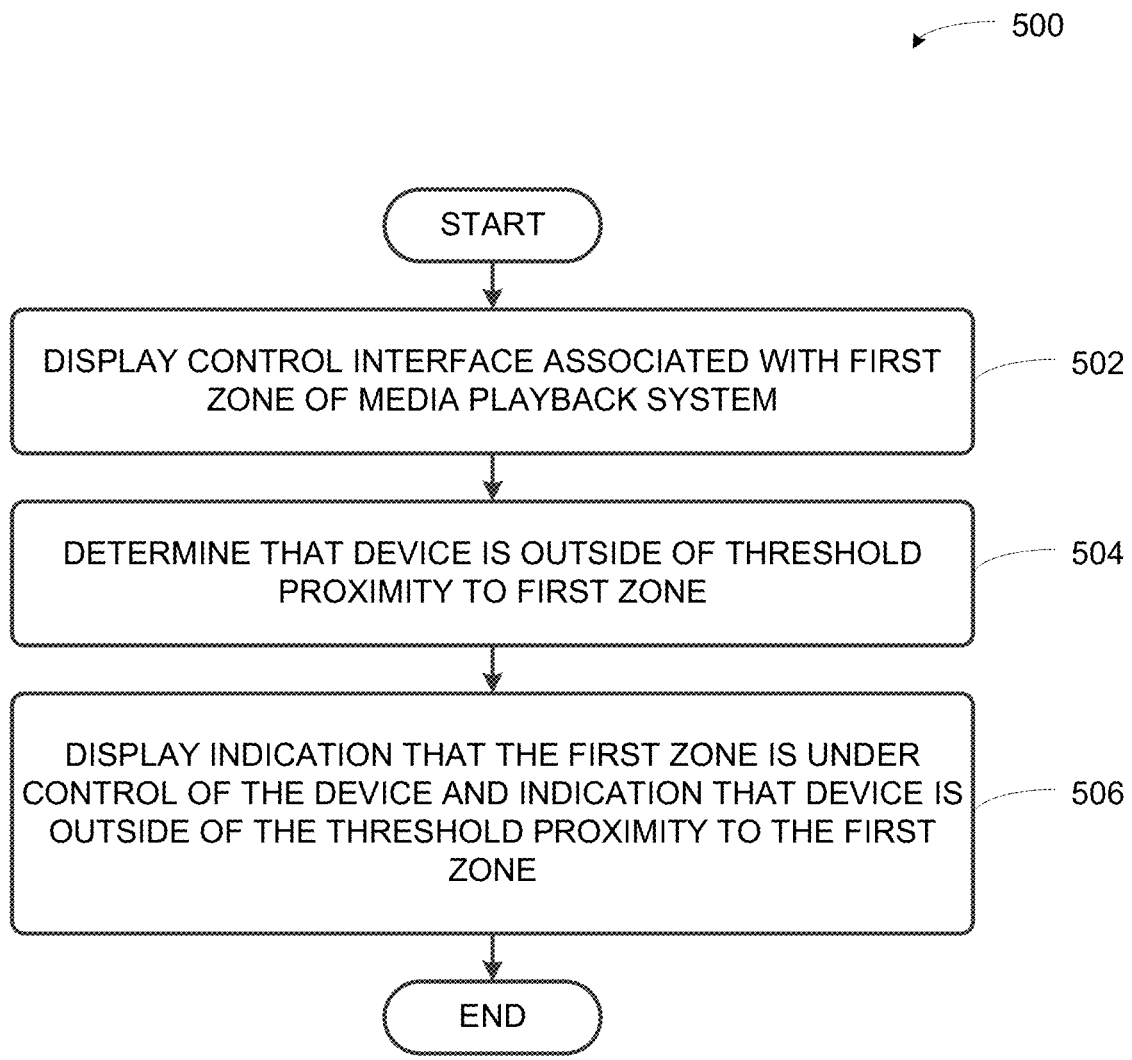
FIG. 5 shows an example flow diagram to indicate certain aspects of zone control in a multi-zone media playback system, according to an example implementation.
Figure 8:
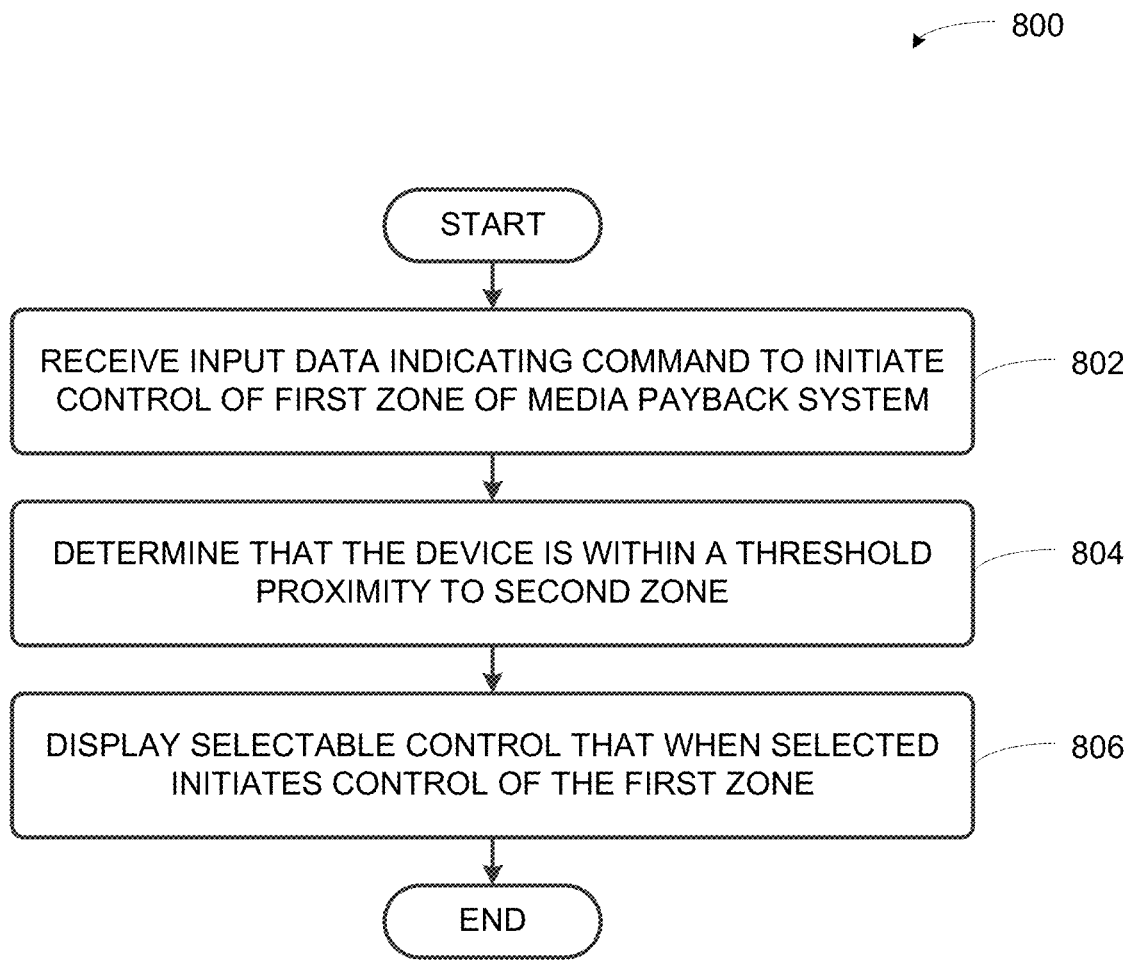
FIG. 8 shows an example flow diagram to verify control of a particular zone in a multi-zone media playback system, according to an example implementation.
Figure 10:
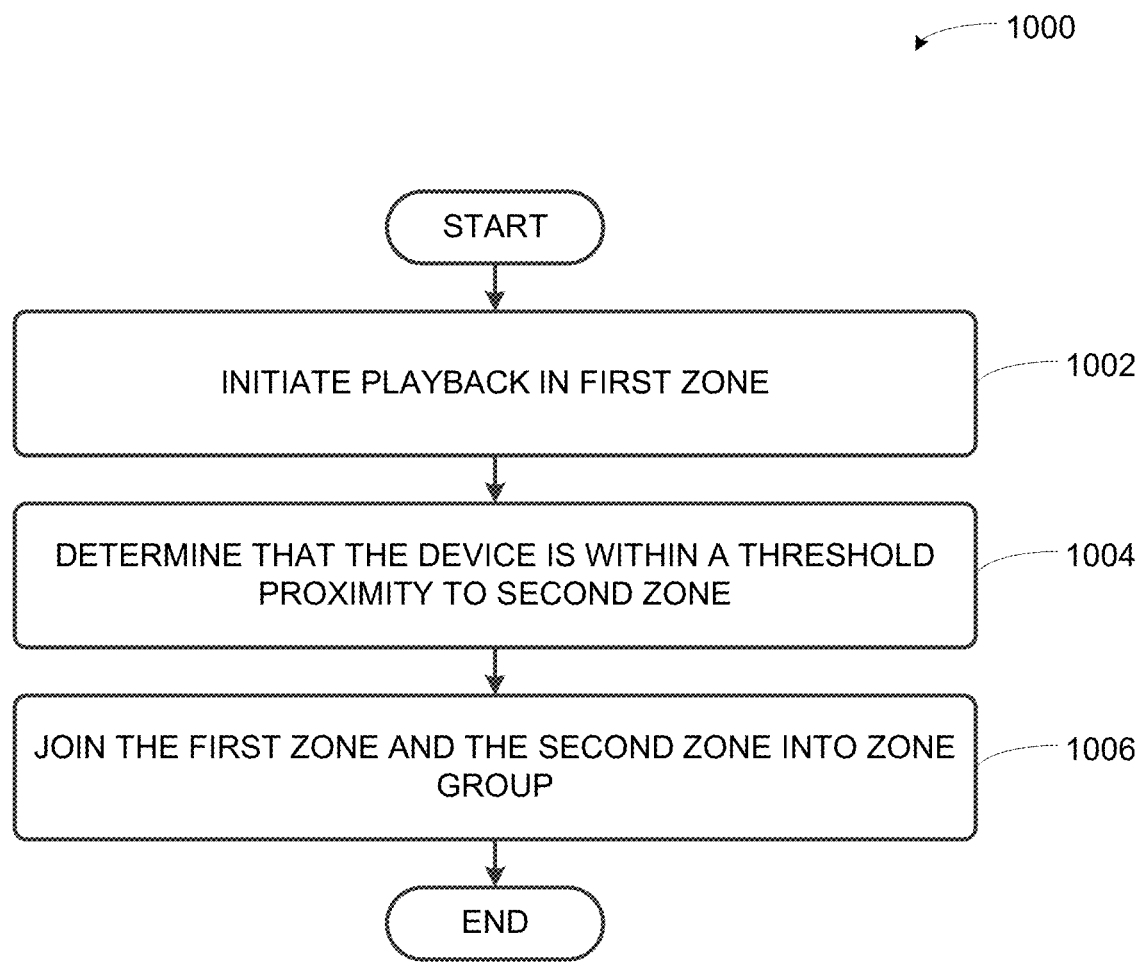
FIG. 10 shows an example flow diagram to facilitate a control device joining a first zone and a second zone of a media playback system into a zone group, according to an example implementation.

Methods 500, 800, and 1000 shown in FIGS. 5, 8, and 10, respectively, present embodiments of methods that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Methods 500, 800, and 1000 may include one or more operations, functions, or actions as illustrated by one or more of blocks shown in FIGS. 5, 8, and 10, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods and other processes disclosed herein, each block may represent circuitry that is wired to perform the specific logical functions in the process.

III. Example Techniques to Indicate Zone Control

As discussed above, embodiments described herein may involve displaying a notification indicating that the control device is located outside of a zone that is presently under control by the control device. FIG. 5 illustrates an example method 500 by which a device may indicate certain aspects of zone control in a multi-zone media playback system.

a. Display Control Interface Associated With A First Zone Of A Media Playback System At block 502, method 500 involves displaying a control interface associated with a first zone of a media playback system. For instance, a control device, such as control device 300 of FIG. 3, may display a control interface (e.g., controller interface 400 of FIG. 4) that is associated with a first zone of a media playback system (e.g., a zone of media playback system 100 of FIG. 1). As another example, the control device may display a control interface that is associated with a zone group to which the first zone belongs (e.g., a zone group of two or more zones of media playback system 100 of FIG. 1).

Figure 6B:
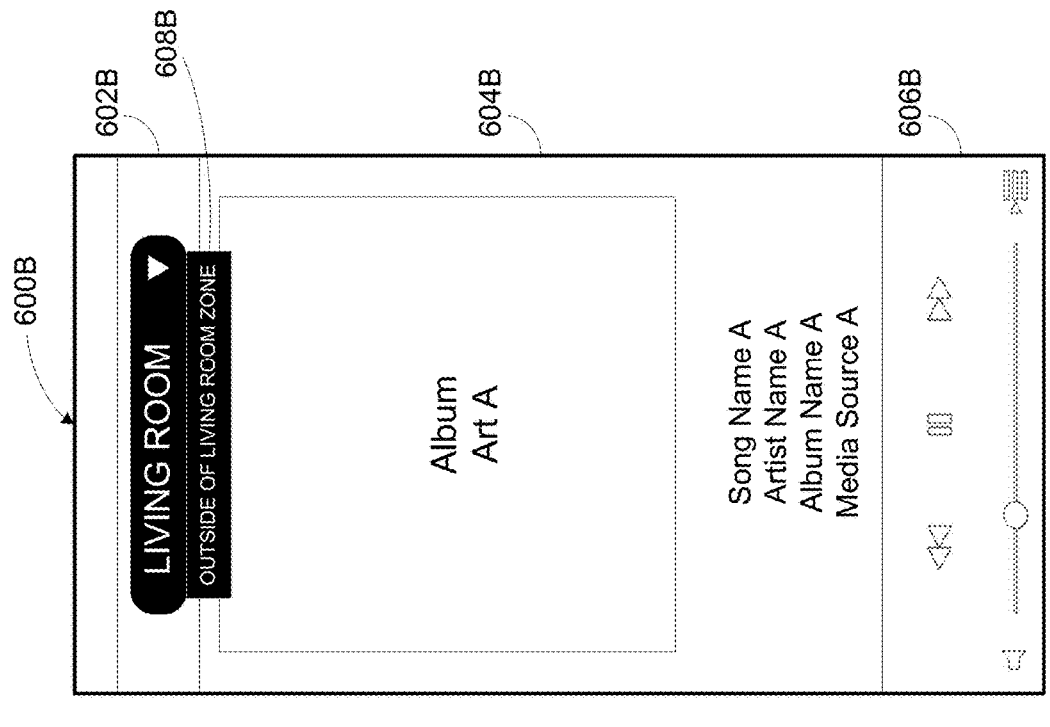
FIG. 6B illustrates another example control interface, according to an example implementation.
Figure 6A:
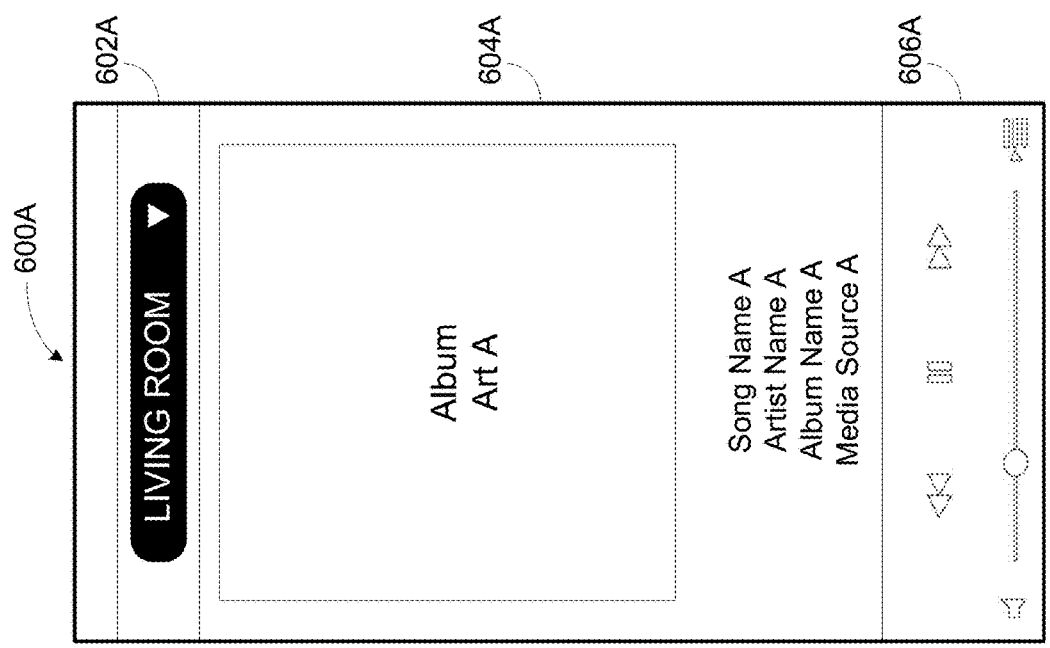
FIG. 6A illustrates an example control interface, according to an example implementation.

FIG. 6A shows an example control interface 600A that includes a playback zone region 602A, a playback status region 604A, and a playback control region 606A. A control device, such as control device 128 of FIG. 1, may display control interface 600A on a graphical interface. A control interface, such as control interface 600A, may correspond to a particular zone of a media playback system (e.g., the Living Room zone of media playback system 100).

A playback zone region of a control interface may include a representation of the zone with which the control interface is associated. As shown in FIG. 6A, playback zone region 602A includes an indication of the "Living Room" zone of media playback system 100. As noted above, the Living Room zone of media playback system 100 of FIG. 1 includes playback devices 104, 106, 108, and 110.

Within examples, a playback status region includes a representation of audio content that is presently being played, previously played, or scheduled to play next in the Living Room zone. Playback status region 704A includes contextual information about the "Living Room" zone, including information about media that is currently playing or queued in the zone. The information includes Album Art A, Song Name A, Artist Name A, and Media Source A, which represent metadata of the media that is currently playing or queued in the zone.

A playback control region includes transport controls for the zone. Playback control region 706A includes transport controls for the "Living Room" zone. Such controls may initiate, stop, or modify playback by playback devices 104, 106, 108, and 110 (i.e., the playback devices in the "Living Room" zone).

b. Determine That The Device Is Outside Of A Threshold Proximity To The First Zone Referring again to FIG. 5, at block 504, method 500 involves determining that the device is outside of a threshold proximity to the first zone. For instance, control device 128 of FIG. 1 may determine that it is outside of a threshold proximity to the Living Room zone. Alternatively, a playback device may determine that control device is outside of a threshold proximity to the Living Room zone, and transmit data indicating this relative positioning to control device 128.

In some embodiments, one or more playback devices of a media playback system may maintain location awareness data indicating where the control device(s) of the media playback system are located relative to the zones of the media playback system. For instance, referring back to FIG. 1, a playback device of media playback system 100 (e.g., playback device 108) may maintain data indicating which control devices are in proximity to the Living Room zone (i.e., control device 126). Playback device 120 may maintain data indicating which control devices are in proximity to the Living Room zone (i.e., control device 128). The location awareness data may include a state table correlating The playback devices of media playback system 100 may share (i.e., transmit) this data among themselves via their respective network interfaces, such that one or more of the playback devices may maintains or has access to location awareness data indicating where the control device(s) of the media playback system are located relative to the zones of the media playback system.

Such a location awareness data may facilitate determining that the device is outside of a threshold proximity to the first zone. For instance, control device 128 may query one or more playback devices of media playback system 100 for an indication of whether control device 128 is within a threshold proximity to a given zone of media playback system 100 (e.g., the Living Room zone). In some cases, control device 128 may query a playback device of the Living Room zone for this information. Alternatively, control device 128 may query a playback device of another zone (e.g., a playback device of a zone near control device 128). In response to the query, control device 128 may receive data indicating whether (or not) it is outside of the threshold proximity to the Living Room zone of media playback system 100.

In some cases, determining that the control device is outside of the threshold proximity to the first zone may involve determining that the control device is within the threshold proximity to the second zone. For instance, control device 128 may query a playback device for an indication of whether control device 128 is within a threshold proximity to the Living Room zone of media playback system 100. In response to the query, control device 128 may receive data indicating that control device 128 is within a threshold proximity to the Bedroom zone (that includes playback device 120). Such data may also indicate that control device 128 is outside of the threshold proximity to the Living Room zone.

The one or more playback devices may develop such location awareness by communicating (or attempting to communicate) via radio transmission with the control device. Example communication interfaces include WI-FI®, BLUETOOTH®, or Near-Field Communications (NFC), among other examples. As noted above, control devices and playback devices may include such communications interfaces so as to enable communication among the devices.

In some implementations, a successful radio transmission may in and of itself indicate that the device is within a given proximity to a zone of the media playback system. For instance, the act of completing a radio transmission over a BLUETOOTH® or NFC protocol (e.g., a message that is part of a pairing or handshaking procedure) may approximate the distance between the particular playback device and a control device to within threshold proximity.

For example, playback device(s) of media playback system 100 may transmit a radio transmission directed to control devices that are within range of the communications interface of the playback device. Upon receiving such a radio transmission, a control device may respond with a transmission to the playback device, thereby informing the playback device that the control device is within range of the playback device (and perhaps to the zone to which the playback device belongs). A lack of response (within a timeout period) may indicate to the playback device that there are no control devices within the threshold proximity to the zone. In either case, the playback device may update the location awareness data to indicate which control devices are within (or outside of) the threshold proximity to the zone. The playback device(s) may repeat this process periodically, so as to maintain an up-to-date location awareness of the control device(s) relative to the zones of the media playback system.

In further examples, the control device may direct radio transmissions to playback devices that are within range of the communications interface of the control device. Upon receiving such a radio transmission, a playback device may update the location awareness data to indicate that control device is within the threshold proximity to its zone. Alternatively, the playback device may respond with a transmission to the playback device, thereby informing the control device that the playback device is within range of the control device (and perhaps to the zone to which the playback device belongs). The control device may then update location awareness data stored and maintained by the control device.

Other implementations may involve detecting the receive strength of the radio transmission between a control device and a playback device. In such cases, determining that the device is outside of a threshold proximity to the first zone may involve determining that a receive strength of a received radio transmission is less than a pre-determined threshold strength (or perhaps non-existent). The threshold strength may be configured to a threshold that indicates that the device is within a certain unobstructed distance from the playback device (e.g., 5 meters). Such a pre-determined threshold strength may be a pre-determined percentage of a known transmission strength, such that the receive strength indicates the degree to which the transmitted signal was attenuated prior to reception.

c. Display An Indication That The First Zone Is Under Control Of The Device and An Indication That The Device Is Outside Of The Threshold Proximity To The First Zone.

Referring back to FIG. 5, at block 506, method 500 involves displaying (i) an indication that the first zone is under control of the device, and (ii) an indication that the device is outside of the threshold proximity to the first zone. For example, control device 300 may display an indication that the first zone is under control of control device 300. Control device 300 may also display an indication that control device 300 is outside of the threshold proximity to the first zone. Such indications may notify a user that she is outside of the zone that will be controlled should input be received on the displayed control interface. Such a notification may avoid a situation in which playback is unexpectedly initiated in a different zone from which the user is located. As described above, unexpectedly initiating playback in a Bedroom zone (perhaps containing a sleeping baby) may degrade user experience, as a user may be upset that playback was started in the Bedroom zone rather than the zone that was intended (e.g., the Living Room zone).

FIG. 6B shows an example control interface 600B that includes a playback zone region 602B, a playback status region 604B, and a playback control region 606B. In some examples, control device 128 shown in FIG. 1 may display an indication that the Living Room zone is under control of the control device 128. As shown in FIG. 6B, playback zone region 602B includes an indication of the "Living Room" zone of media playback system 100, which indicates that the Living Room zone is under control of the control device 128. Further, control device 128 may determine that it is located outside of a threshold proximity to the Living Room zone and responsively display an indication that control device 128 is outside of the threshold proximity to the Living Room zone. By way of example, control interface 608B includes a graphical element 608B indicating that control device 128 is outside of the Living Room zone.

In some embodiments, the control device may cause a graphical interface to display the indication that the first zone is under the control of the control device and the indication that control device is outside of the threshold proximity to the first zone in combination with one another. For instance, a control device may cause a graphical interface to highlight, with a pre-determined color the indication that the first zone is under control of the control device. In such embodiments, a highlighted indication that the first zone is under control of the control device may indicate that control device is outside of the threshold proximity to the first zone while a non-highlighted indication that the first zone is under control of the control device may indicate that control device is outside of the threshold proximity to the first zone.

Figure 6D:
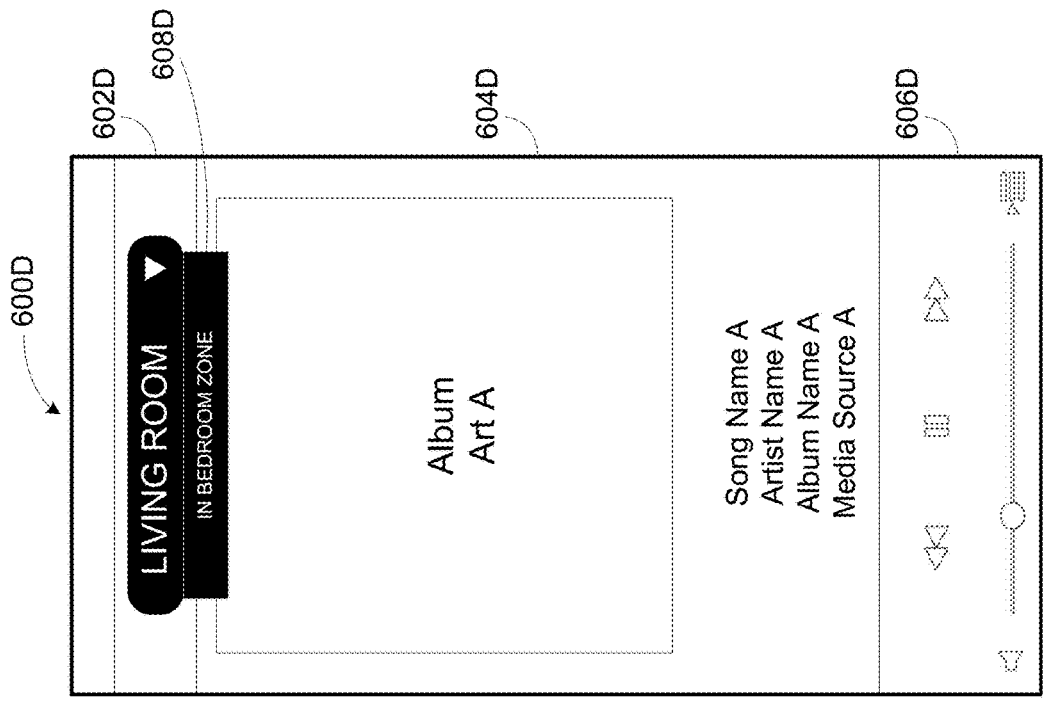
FIG. 6D illustrates yet another example control interface, according to an example implementation.
Figure 6C:
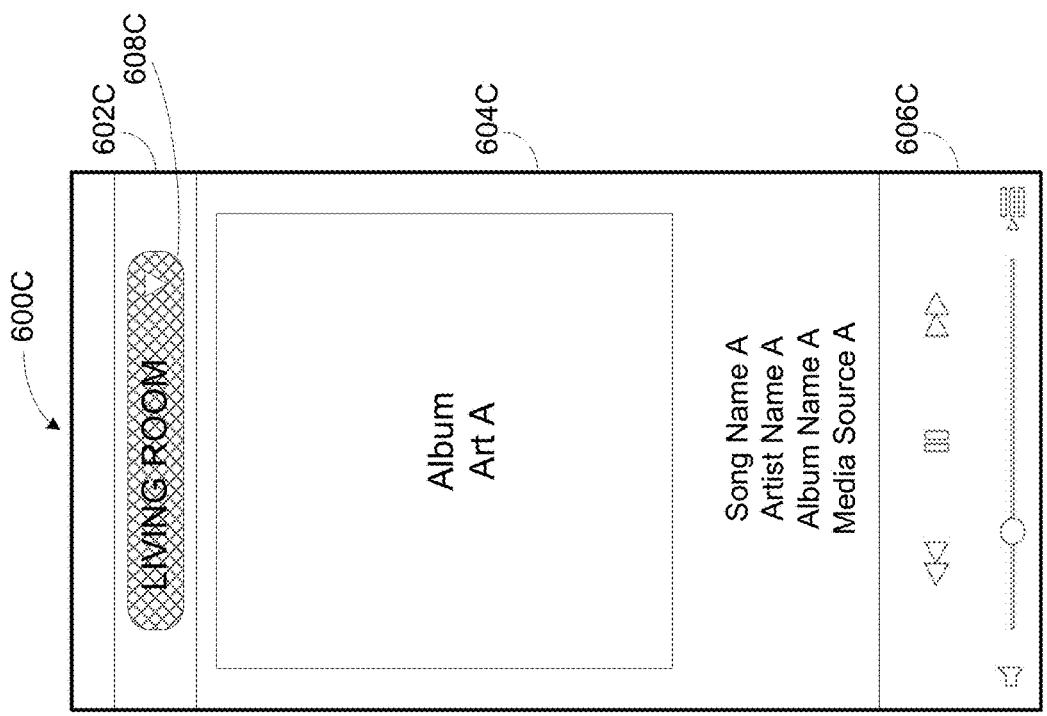
FIG. 6C illustrates a further example control interface, according to an example implementation.

FIG. 6C shows an example control interface 600C that includes a playback zone region 602C, a playback status region 604C, and a playback control region 606C. As shown in FIG. 6C, playback zone region 602C includes an indication of the "Living Room" zone of media playback system 100, which indicates that the Living Room zone is under control of the control device 128. Further, control device 128 may determine that it is located outside of a threshold proximity to the Living Room zone and responsively highlight, with a pre-determined color, the indication that the Living Room Zone is under control of the control device. By way of example, control interface 608B is shown with a graphical element 608C that represents highlighting of the indication of the "Living Room" zone of media playback system 100, which indicates that the Living Room zone is under control of the control device 128. The highlighting that is represented by graphical element 608C indicates that control device 128 is outside of the Living Room zone.

Within examples, displaying the indication that the control device is outside of the threshold proximity to the first zone may involve causing a graphical interface to display an indication that the control device is within the threshold proximity to a second zone. For instance, control device 128 may determine that it is located within a threshold proximity to the Bedroom zone and responsively display an indication that it is within the threshold proximity to the Bedroom zone. Such an indication may notify a user as to which zone the control device is located within (which might be different that the zone associated with the control interface that is currently displayed by the control device).

In some embodiments, control device 128 indicates this proximity by highlighting the indication that the Living Room zone is under control of control device 128 with a pre-determined color that corresponds to the Bedroom zone. For instance, graphical element 608C may highlight the indication that the Living Room zone is under control of control device 128 in blue (given that the color blue corresponds to the Bedroom zone). Each zone of media playback system 100 may correspond to a different color, such that the color indicates the zone. A controller interface may display an indication correlating each zone to a particular color.

As another example, FIG. 6D shows an example control interface 600D that includes a playback zone region 602D, a playback status region 604D, and a playback control region 606D. As shown in FIG. 6D, playback zone region 602D includes an indication of the "Living Room" zone of media playback system 100, which indicates that the Living Room zone is under control of the control device 128. Further, control interface 608B includes a graphical element 608D that indicates that control device 128 is within the Bedroom zone.

In some examples, a control device may cause a graphical interface to display a selectable control that, when selected, causes the graphical interface to display a control interface that is associated with the second zone of the media playback system. This may aid in switching to a control interface associated with a zone in which the control device is currently located. For instance, control device 128 may determine that it is located within a threshold proximity to the Bedroom zone and responsively display a selectable control that, when selected, causes the graphical interface to display a control interface that is associated with the Bedroom zone of media playback system 100.

Figure 6E:
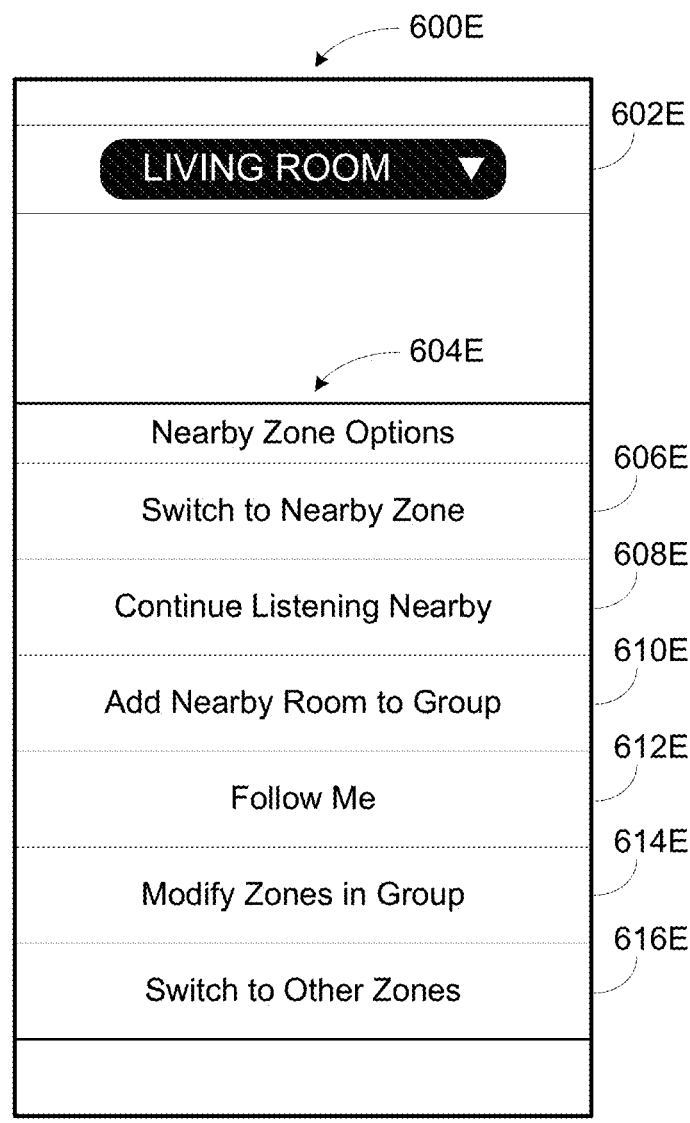
FIG. 6E illustrates another example control interface, according to an example implementation.

FIG. 6E shows an example control interface 600E that includes a playback zone region 602E and a prompt 604E with nearby zone options (i.e., selectable controls). A control device, such as control device 128, may display such a prompt when control device 128 determines that it is located within a threshold proximity to a zone other than the zone presently under control of the control device (e.g., the Bedroom zone). Among the nearby zone options, prompt 604E includes a selectable control 606E that, when selected, causes the graphical interface to display a control interface associated with the nearby zone (i.e., the Bedroom zone).

In some embodiments, prompt 604E of control interface 600E also includes a selectable control 608E that, when selected, causes the media playback system to initiate playback, in the nearby zone (i.e., the Bedroom zone) of the media items queued in the Living Room zone. Such a control may facilitate switching playback of a particular media item (or set of media items) from the zone presently under control by the control device to a zone that the control device is presently in (or near).

Prompt 604E of control interface 600E may further include a selectable control 610E that, when selected, causes the media playback system to join the nearby zone (i.e., the Bedroom zone) and the zone presently under control by the control device (i.e., the Living Room zone) into a zone group. This zone group may be configured to jointly play back media. For instance, the zone group may play back media items queued in the Living Room zone (to which the Bedroom zone was joined) in synchrony.

Within examples, prompt 604E of control interface 600E may further include a selectable control 612E that, when selected, causes the media playback system to playback a queue in the zone that that the control device is presently located. For example, selection of selectable control 612E may cause the playback devices of the Bedroom zone (i.e., playback device 120) to begin playback of the media items queued in the Living Room zone. The control device may then be moved to the Office zone, which causes the playback devices of the Office zone (i.e., playback device 118) to begin playback of the media items queued in the Living Room zone (and perhaps also causes the playback devices of the Bedroom zone to stop playback).

As noted above, in some cases, the control interface may be associated with a zone group. In such cases, prompt 604E of control interface 600E may further include a selectable control 614E that, when selected, causes the graphical interface to display an interface to modify the zones that are in the zone group. Such an interface may facilitate adding additional zones to the zone group or perhaps removing certain zones from the zone group.

In some embodiments, prompt 604E of control interface 600E may further include a selectable control 616E that, when selected, causes the graphical interface to display an interface to that includes one or more selectable controls associated with respective zones that, when selected, cause the graphical interface to display a control interface associated with the selected zone. For instance, the control interface may include selectable controls associated with one or more of the Living Room zone, the Dining Room zone, the Kitchen zone, the Bathroom zone, the Office zone, the Master Bedroom zone, the Bedroom zone, or the Balcony zone. This control interface may facilitate control of the different zones of media playback system 100.

As noted above, in some cases, the control device may be moved into the first zone. For instance, control device 128 may be moved to the Living Room zone. Control device 128 may determine that it is now within a threshold proximity to the Living Room zone and remove from display the indication that it is outside of the threshold proximity to the Living Room zone (as control device 128 is now within the threshold proximity to the Living Room zone).

To facilitate proximity determination, a communications interface (e.g., a WI-FI®, BLUETOOTH®, or Near-Field Communications (NFC) interface) of a playback device may be configured to emit a directional radiation pattern (e.g., a fan or cone shaped pattern). In practice, playback devices tend to be oriented such that their speaker cones are directed into the room in which the playback device is located. For instance, playback device 104 is orientated so as to point its speaker cones toward the center of the Living Room. By attenuating the radiation pattern of the playback device into a fan or cone shape and aligning this radiation pattern and the speaker cones in the same direction, the radiation pattern is more likely to correspond to the room in which the zone is located.

Figure 7:
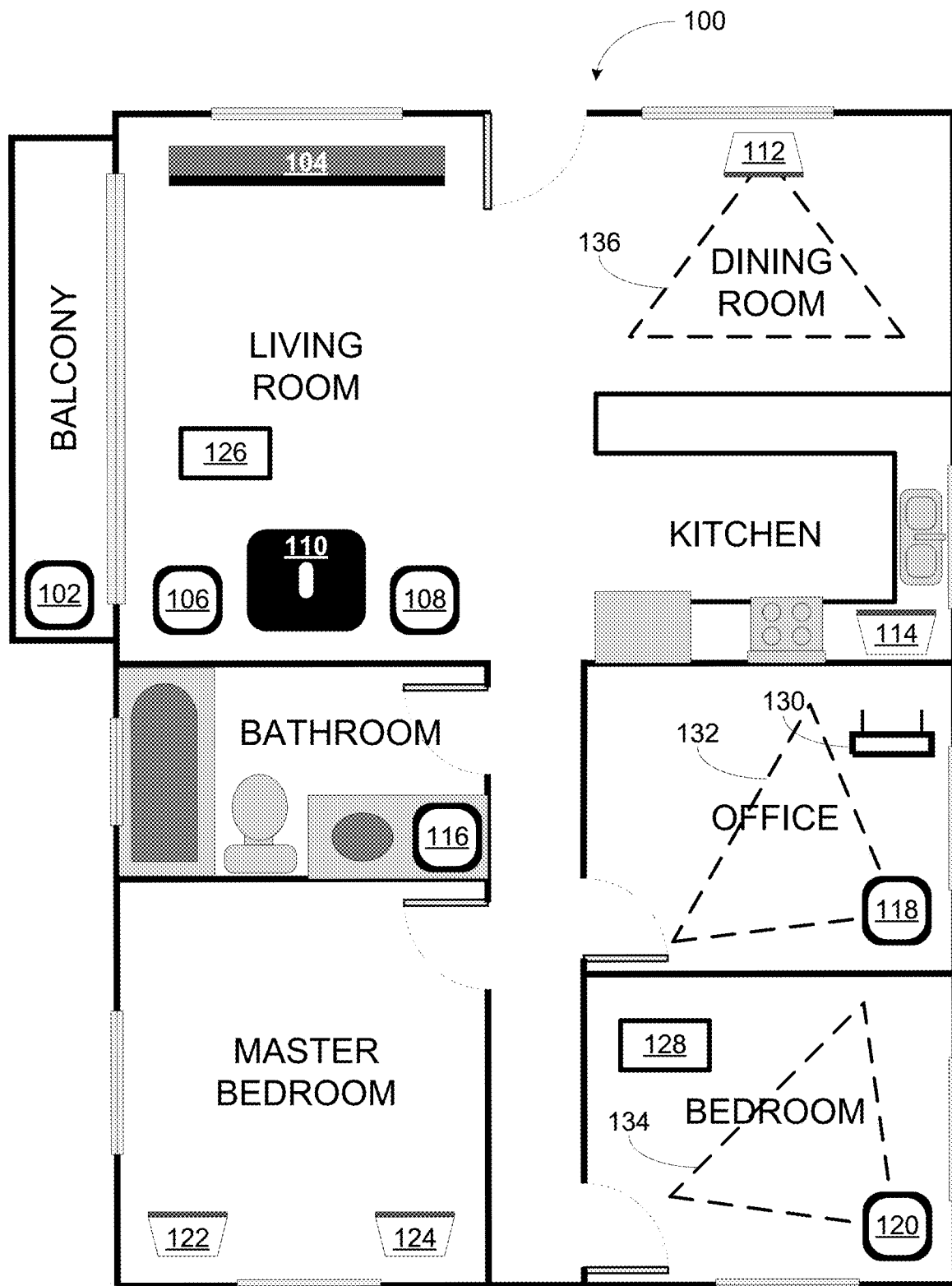
FIG. 7 shows an example media playback system configuration, according to an example implementation.

FIG. 7 shows media playback system 100. In FIG. 7, playback devices 112, 118, and 120 include directional antennas that produce radiation patterns 132, 134, and 136, respectively. As shown, such radiation patterns correlate to the room in which the playback device is located. In contrast, a playback device with an omni-directional antenna (and corresponding omni-directional radiation pattern) may cause relatively more of the transmission to bleed across rooms (and across zones). For instance, where playback device 118 equipped with an omni-directional antenna, playback device 118 might be more likely to detect control device 128 as being in proximity to the Office zone.

To further aid in proximity determination, data indicating transmissions between multiple playback devices and a control device may be processed into a heat map indicating a likely location of the control device relative to a given zone. For instance, repeated successful transmissions between control device 126 and playback devices 104, playback device 106, playback device 108, and playback device 110 may strongly indicate that control device 126 is located within the Living Room zone (and result in a "hot" spot on the heat map).

Alternatively, signal strengths between the device 126 and playback devices 104, playback device 106, playback device 108, and playback device 110 may be processed into a heat map. For example, in the location of control device 126 shown in FIG. 1, transmissions between control device 126 and one or more of playback devices 104, playback device 106, playback device 108, or playback device 110 may have given signal strengths. If control device 126 repeatedly controls the Living Room zone from the same position (having approximately the same signal strengths) that location may be designated as a hot spot on the heat map correlating to the Living Room zone. Subsequent determinations of the location of the control device may be influenced by this heat map.

IV. Example Techniques to Verify Zone Control

As noted above, embodiments described herein may involve verifying certain commands to control the media playback system prior to carrying out those commands on the media playback system. FIG. 8 illustrates an example method 800 by which a device may verify control of a particular zone in a multi-zone media playback system.

a. Receive Input Data Indicating A Command To Initiate Control Of A First Zone Of A Media Playback System At block 802, method 800 involves receiving input data indicating a command to initiate control of a first zone of a multiple zone media playback system. For instance, a control device, such as control device 300, may detect input data indicating a command to initiate control of a first zone of a media playback system that includes a first zone and a second zone (and possibly additional zones, such as a third zone).

In some embodiments, receiving input data indicating the command to initiate control of the first zone may involve receiving input data indicating a command to display a control interface that is associated with the first zone. For example, control device 128 of FIG. 1, may detect input indicating a command to display a control interface that is associated with a zone of media playback system 100 (e.g., the Office zone).

Figure 9B:
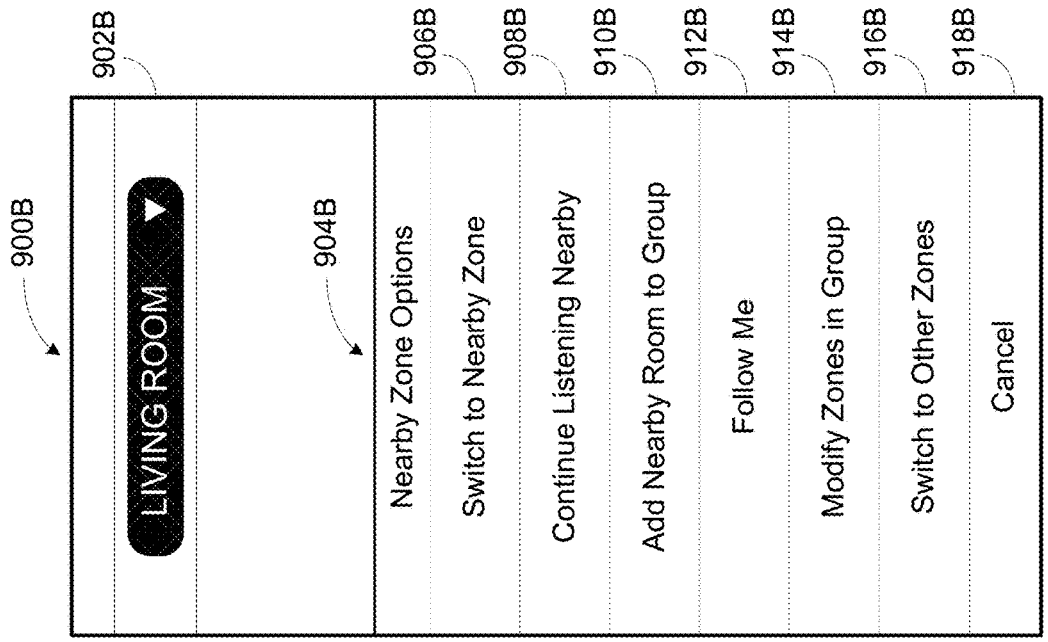
FIG. 9B illustrates another example control interface, according to an example implementation.
Figure 9A:
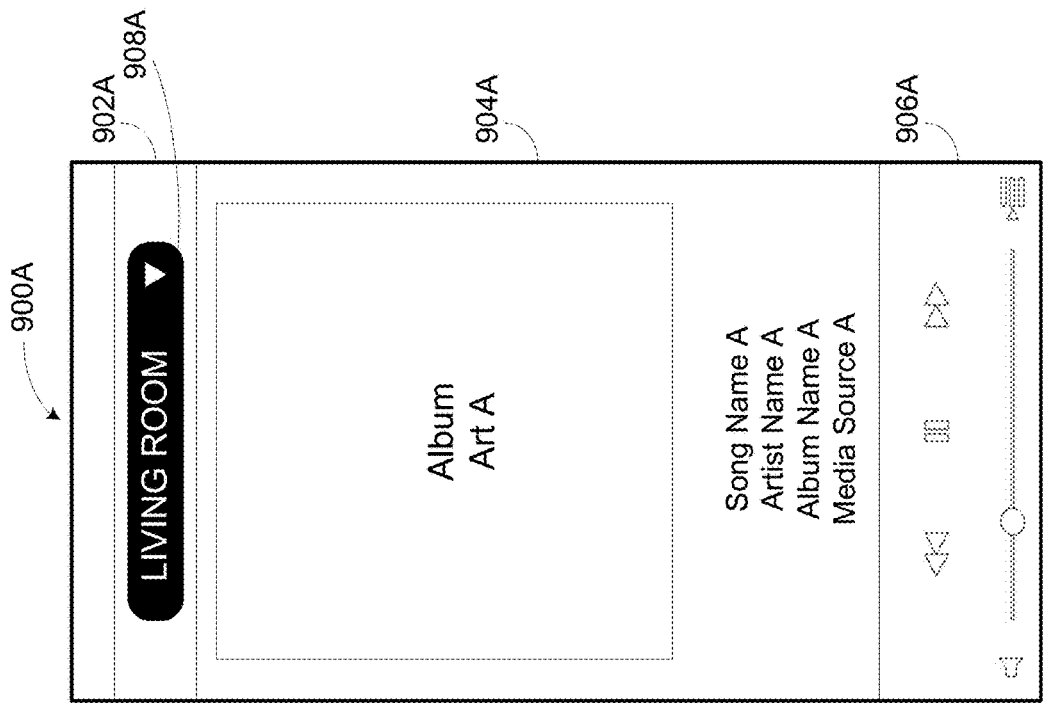
FIG. 9A illustrates an example control interface, according to an example implementation.

FIG. 9A shows an example control interface 900A that includes a playback zone region 902A, a playback status region 904A, and a playback control region 906A. A control device, such as control device 128 of FIG. 1, may display control interface 900A on a graphical interface. Control interface 600A is associated with the Living Room zone of media playback system 100. Playback zone region 902A includes a selectable control 908C which indicates that Control interface 600A is associated with the Living Room zone. When selected, selectable control 908C may display a prompt, such as prompt 604E of FIG. 6E. An example command to initiate control of a zone of a media playback system 100 may include a selection of selectable control 908C.

As another example, control device 128 may detect input indicating a command to initiate playback on the zone of the media playback system that is currently under control of the control device. For instance, control device 128 may be displaying a control interface associated with the Living Room zone (e.g., control interface 600A of FIG. 6A) and detect input indicating a command to initiate playback in the Living Room zone (e.g., control device 128 may receive input data indicating a press of a "Play" button on control interface 600A).

b. Determine That The Device Is Within A Threshold Proximity To A Second Zone

At block 804, method 800 involves determining that the control device is within a threshold proximity to a second zone. For instance, control device 128 may determine that it is within a threshold proximity to the Bedroom zone of media playback system 100. As described above in connection with method 500, a control device of a media playback system may use one of several different techniques to determine whether it is within a threshold proximity to a particular zone of a media playback system.

Within examples, a control device may determine whether the control device is within the threshold proximity to the first zone or to another zone (e.g., the second zone) prior to initiating control of the first zone (per the received command). Such a determination may facilitate verifying that the control device is in proximity to the zone to which the command is directed.

c. Display A Selectable Control That, When Selected, Initiates Control Of The First Zone At block 806, method 800 involves displaying a selectable control that, when selected, initiates control of the first zone. For instance, control device 128 may cause a graphical interface to display a selectable control that, when selected, initiates control of the Office zone. Control device 128 may display such a selectable control before initiating control of the Office zone (per a received command to initiate control of the Office zone). Selection of the selectable control may verify that control of the first zone is intended even though the control device is proximity to the second zone (and perhaps not the first zone).

In some embodiments, causing the graphical interface to display the selectable control that, when selected, initiates control of the first zone may involve causing the graphical interface to display a selectable control that, when selected, initiates playback on the one or more first playback devices of the first zone in synchrony. For example, upon determining that it is within a threshold proximity to the Bedroom zone of media playback system 100, control device 128 may display a prompt with one or more selectable controls. The prompt may include a selectable control that, when selected, initiates playback on the playback device(s) of the Office zone in synchrony.

FIG. 9B shows an example control interface 900B that includes a playback zone region 902B and a prompt 904B with nearby zone options (i.e., selectable controls). A control device, such as control device 128, may cause a graphical interface to display such a prompt. Among other selectable controls, prompt 904B includes a selectable control 918B that, when selected, causes the graphical interface to stop displaying the prompt 904B. In some examples, selection of selectable control 918B may initiates playback on the playback device(s) of the Office zone in synchrony (e.g., according to the received command to initiate control of the Office zone).

Within examples, causing the graphical interface to display the selectable control that, when selected, initiates control of the first zone may involve causing the graphical interface to display a selectable control that, when selected, initiates playback on the one or more second playback devices of the first second in synchrony. As noted above, upon determining that it is within a threshold proximity to the Bedroom zone of media playback system 100, control device 128 may display a prompt with one or more selectable controls. The prompt may include a selectable control that, when selected, initiates playback on the playback device(s) of the Bedroom zone in synchrony. For instance, prompt 904B of control interface 900B includes a selectable control 906B that, when selected, causes the media playback system to initiate playback, in the nearby zone (i.e., the Bedroom zone)

In some embodiments, the control device may display selectable controls that provide the option of controlling the first zone or the second zone. For instance, control device 128 may cause a graphical interface to display a selectable control that, when selected, causes the graphical interface to display a control interface that is associated with a first zone (i.e., the Office zone) and a selectable control that, when selected, causes the graphical interface to display the control interface that is associated with a second zone (i.e., the Bedroom zone). Upon detecting input data indicating a selection of one of the selectable controls, control device 128 may cause a graphical interface to display the corresponding control interface. By way of example, prompt 904B includes a selectable control 906B that, when selected, causes the graphical interface to display a control interface associated with the nearby zone (i.e., the Bedroom zone).

Prompt 904B of control interface 900B may further include a selectable control 910B that, when selected, causes the media playback system to join the nearby zone (i.e., the Bedroom zone) and the zone presently under control by the control device (i.e., the Living Room zone) into a zone group. This zone group may be configured to jointly play back media. For instance, the zone group may play back media items queued in the Living Room zone (to which the Bedroom zone was joined) in synchrony. In some cases, selectable control 910B may also initiate playback on the playback devices of the zone group.

Within examples, prompt 904B of control interface 900B may further include a selectable control 912B that, when selected, causes the media playback system to playback a queue in the zone that that the control device is presently located.

As noted above, in some cases, the control interface may be associated with a zone group. In such cases, prompt 904B of control interface 900B may further include a selectable control 914B that, when selected, causes the graphical interface to display an interface to modify the zones that are in the zone group. Such an interface may facilitate adding additional zones to the zone group or perhaps removing certain zones from the zone group.

In some embodiments, prompt 904B of control interface 900B may further include a selectable control 916B that, when selected, causes the graphical interface to display an interface to that includes one or more selectable controls associated with respective zones that, when selected, cause the graphical interface to display a control interface associated with the selected zone. For instance, the control interface may include selectable controls associated with one or more of the Living Room zone, the Dining Room zone, the Kitchen zone, the Bathroom zone, the Office zone, the Master Bedroom zone, the Bedroom zone, or the Balcony zone. This control interface may facilitate control of the different zones of media playback system 100.

Figure 9D:
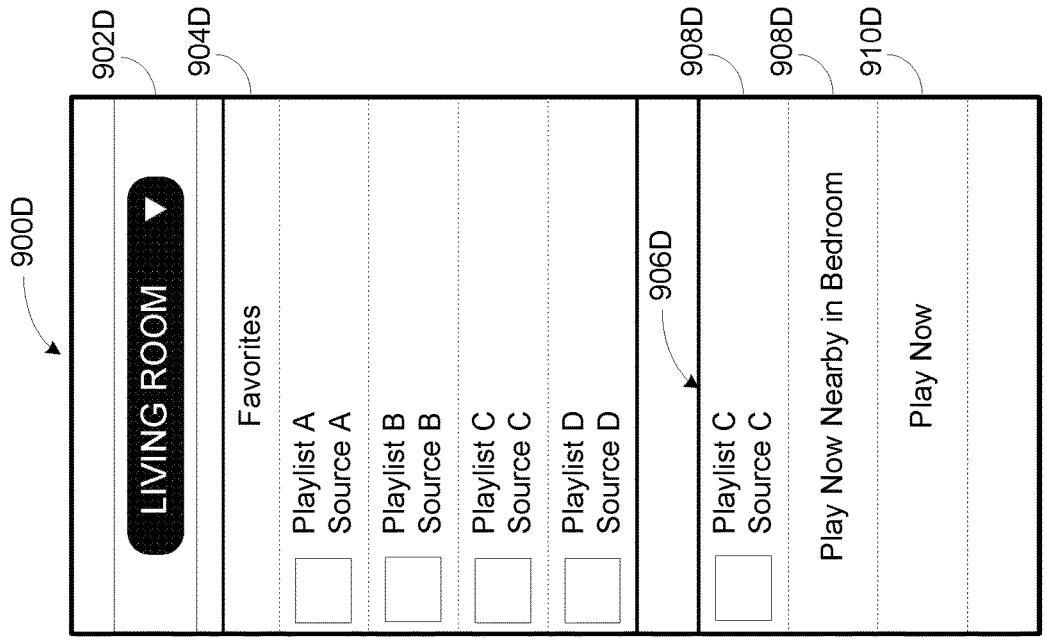
FIG. 9D illustrates a further example control interface, according to an example implementation.
Figure 9C:
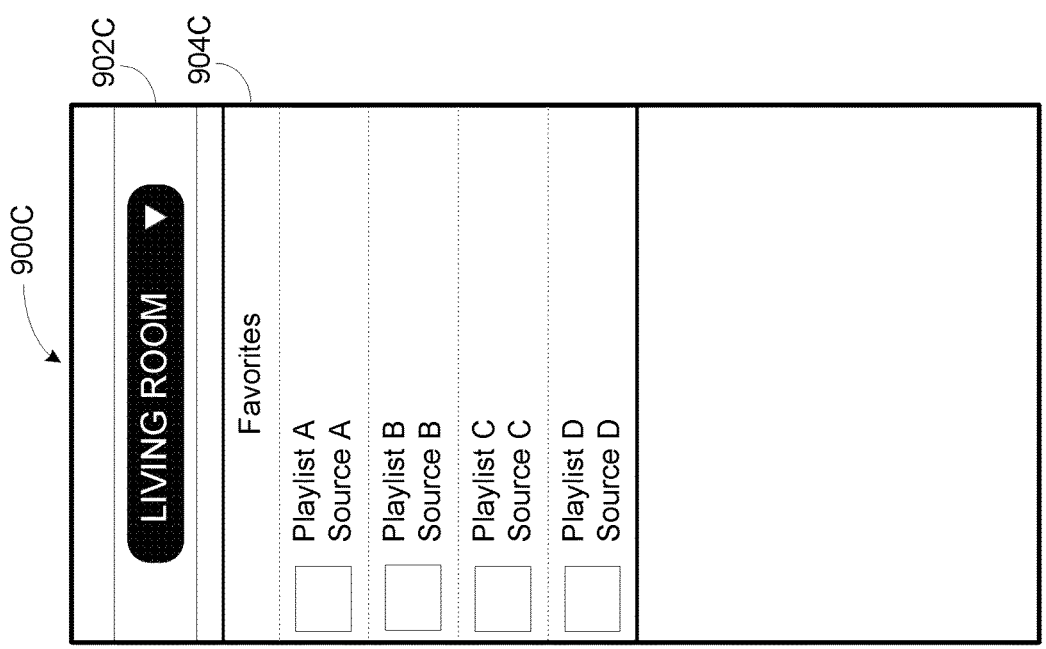
FIG. 9C illustrates a further example control interface, according to an example implementation.

FIG. 9C shows an example control interface 900C that includes a playback zone region 902C and an audio content sources region 904C containing selectable indications of playlists (in this example, playlists that have been designated as "Favorites"). In some cases, selection of a given selectable indication may cause playback in the zone indicated in the playback zone region 902C (i.e., the Living Room zone of media playback system 100). As noted above, in some cases, receiving input data indicating a command to initiate control of the first zone may involve receiving input data indicating a command to initiate playback. For instance, control device 128 may display control interface 900C and detect input data indicating a selection of Playlist C. As indicated above, control device 128 may determine that it is within a threshold proximity to another zone (i.e., the Bedroom zone). Further, as noted above, control device 128 may display a selectable control before initiating control (i.e., playing Playlist C in the Living Room zone).

For instance, control device 128 may display a prompt with one or more selectable controls. FIG. 9D shows an example control interface 900D that includes a playback zone region 902D and an audio content sources region 904D. Prompt 906D includes a graphical element 908D indicating the selected media (Playlist C). Prompt 906D also includes a selectable control 908D that, when selected, initiates playback of the selected media in the nearby zone (i.e., the Bedroom zone). Prompt 906D further includes a selectable control 910D that, when selected, initiates playback of the selected media in the zone indicated in the playback zone region 902C (i.e., the Living Room zone of media playback system 100).

V. Example Techniques to Facilitate Zone Grouping

As noted above, embodiments described herein may facilitate zone grouping. FIG. 10 illustrates an example method 1000 to facilitate a control device joining a first zone and a second zone of a media playback system into a zone group when media is playing in a first zone and the control device of the media playback system determines that it is within a threshold proximity to the second zone.

a. Initiate Playback In A First Zone Of A Media Playback System

At block 1002, method 1000 involves initiating playback in a first zone of a media playback system. For instance, control device 126 of FIG. 1 may initiate playback on the playback devices of the Dining Room zone of media payback system 100. Control device 126 may initiate playback of a one or more particular media items (e.g., a queue of media items maintained by a playback device of the Dining Room zone).

In some cases, initiating playback in the first zone of the media playback system may involve initiating playback in a zone group that includes the first zone. For instance, the Dining Room zone and the Kitchen zone of media playback system 100 may be joined into a zone group. Control device 126 may initiate playback in this zone group, which includes the Dining Room zone.

b. Determine That The Control Device Is Within A Threshold Proximity To A Second Zone At block 1004, method 1000 involves determining that the control device is within a threshold proximity to a second zone of the media playback system. For example, after initiating playback in the Dining Room zone (or perhaps a zone group), control device 126 may determine that it is within a threshold proximity to the Living Room zone. In practice, a user might be listening to music in the Dining Room zone, but then walk to the Living Room zone (perhaps carrying their tablet or smartphone (the control device) with them.

As described above in connection with method 500, a control device of a media playback system may use a variety of techniques to determine whether it is within a threshold proximity to a particular zone of a media playback system.

c. Join The First Zone and the Second Zone Into A Zone Group

At block 1006, method 1000 involves joining the first zone and the second zone into a zone group. For instance, after determining that it is within the threshold proximity to the Bedroom zone, control device 126 may join the Dining Room zone and the Living Room zone into a zone group. In other words, grouping may be predicated on playback in the first zone because this playback may indicate that playback should also initiate in the second zone now that the control device is within the second zone (and perhaps also continue in the first zone, per the zone group).

As a zone group, one or more first playback devices of the first zone and the one or more second playback devices of the second zone are configured to play back in synchrony. For instance, upon control device 126 joining the Dining Room zone and the Living Room zone into a zone group, playback devices 104, 106, 108, 110, and 112 are configured to play back in synchrony.

As noted above, in some cases, before the first zone and the second zone are joined into a zone group, the first zone may be in a zone group with another zone (e.g., the zone group that includes the Dining Room zone and the Kitchen zone). Upon joining the Dining Room zone and the Living Room zone into the zone group, control device 126 may separate the Dining Room zone and the Kitchen zone. Alternatively, control device 126 may join the Kitchen zone into the zone group with the Dining Room zone and the Living Room zone.

Further, in some cases, before the first zone and the second zone are joined into a zone group, the second zone may be in a zone group with yet another zone (e.g., a zone group that includes the Living Room zone and the Balcony zone). In joining the Dining Room zone and the Living Room zone into the zone group, control device 126 may separate the Living Room zone and the Balcony zone. Alternatively, control device 126 may join the Balcony zone into the zone group with the Dining Room zone and the Living Room zone.

As noted above, in some cases a control device may verify certain operations prior to carrying them out. For instance, before joining the first zone and the second zone into the zone group, the control device may display a selectable control that, when selected, joins the first zone and the second zone into a zone group. Upon receiving input data indicating a selection of the selectable control, the control device may join the first zone and the second zone into the zone group.

In some cases, joining the first zone and the second zone into the zone group may be predicated on the control device detecting input indicating a selection in a playback zone region, which may indicate that the user is interested in additional zones (such as the zone that the control device is currently located within). For instance, before joining the first zone and the second zone into the zone group, control device 126 may receive input data indicating a command to display a control interface (e.g., control interface 900A of FIG. 9A) that is associated with the second zone of the media playback system (i.e., the Living Room zone). Based on such input data, control device 126 may display a selectable control that, when selected, causes the control device to join the first zone and the second zone into the zone group. Such a control may facilitate the user selecting the zone in which the control device is located (and where the user is located) perhaps without having to navigate the zones of the media playback system (e.g., the plurality of zones of media playback system 100).

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, example techniques may involve displaying a notification that the control device is outside of a zone that is presently under control by the control device. In one aspect, a method is provided. The method may involve displaying a control interface that is associated with a first zone of the media playback system, where the first zone comprises one or more first playback devices; and where the media playback system further includes a second zone that comprises one or more second playback devices. The method may also involve determining that the device is outside of a threshold proximity to the first zone. The method may further involve displaying (i) an indication that the first zone is under control of the device, and (ii) an indication that the device is outside of the threshold proximity to the first zone.

In another aspect, a device is provided. The device includes a network interface, at least one processor, a data storage, and program logic stored in the data storage and executable by the at least one processor to perform functions. The functions may include displaying a control interface that is associated with a first zone of the media playback system, where the first zone comprises one or more first playback devices; and where the media playback system further includes a second zone that comprises one or more second playback devices. The functions may also include determining that the device is outside of a threshold proximity to the first zone. The functions may further include displaying (i) an indication that the first zone is under control of the device, and (ii) an indication that the device is outside of the threshold proximity to the first zone.

In yet another aspect, a non-transitory computer readable memory is provided. The non-transitory computer readable memory has stored thereon instructions executable by a computing device to cause the computing device to perform functions. The functions may include displaying a control interface that is associated with a first zone of the media playback system, where the first zone comprises one or more first playback devices; and where the media playback system further includes a second zone that comprises one or more second playback devices. The functions may also include determining that the device is outside of a threshold proximity to the first zone. The functions may further include displaying (i) an indication that the first zone is under control of the device, and (ii) an indication that the device is outside of the threshold proximity to the first zone.

Also as indicated above, further example techniques may involve verifying certain commands to control the media playback system prior to carrying out those commands on the media playback system. In one aspect, a method is provided. The method may involve receiving input data indicating a command to initiate control of a first zone of a media playback system, where the first zone comprises one or more first playback devices, and where the media playback system further includes a second zone that comprises one or more second playback devices. Before initiating control of the first zone, the method may involve determining that the control device is within a threshold proximity to the second zone. The method may further involve causing a graphical interface to display a selectable control that, when selected, initiates control of the first zone.

In another aspect, a device is provided. The device includes a network interface, at least one processor, a data storage, and program logic stored in the data storage and executable by the at least one processor to perform functions. The functions may include receiving input data indicating a command to initiate control of a first zone of a media playback system, where the first zone comprises one or more first playback devices, and where the media playback system further includes a second zone that comprises one or more second playback devices. The functions may also include, before initiating control of the first zone, determining that the control device is within a threshold proximity to the second zone. The functions may further include causing a graphical interface to display a selectable control that, when selected, initiates control of the first zone.

In yet another aspect, a non-transitory computer readable memory is provided. The non-transitory computer readable memory has stored thereon instructions executable by a computing device to cause the computing device to perform functions. The functions may include receiving input data indicating a command to initiate control of a first zone of a media playback system, where the first zone comprises one or more first playback devices, and where the media playback system further includes a second zone that comprises one or more second playback devices. The functions may also include, before initiating control of the first zone, determining that the control device is within a threshold proximity to the second zone. The functions may further include causing a graphical interface to display a selectable control that, when selected, initiates control of the first zone.

As further indicated above, example techniques may involve facilitating the grouping of a first zone and a second zone of a media playback system. In one aspect, a method is provided. The method may involve initiating playback in a first zone of a media playback system, wherein the first zone comprises one or more first playback devices. After initiating playback in the first zone, the method may involve determining that the control device is within a threshold proximity to at least one of one or more second playback devices of a second zone of the media playback system. After determining that the control device is within the threshold proximity to at least one of one or more second playback devices, the method may include joining the first zone and the second zone into a zone group in which the one or more first playback devices of the first zone and the one or more second playback devices of the second zone are configured to play back in synchrony.

In another aspect, a device is provided. The device includes a network interface, at least one processor, a data storage, and program logic stored in the data storage and executable by the at least one processor to perform functions. The functions may include initiating playback in a first zone of a media playback system, wherein the first zone comprises one or more first playback devices. After initiating playback in the first zone, the functions may include determining that the control device is within a threshold proximity to at least one of one or more second playback devices of a second zone of the media playback system. After determining that the control device is within the threshold proximity to at least one of one or more second playback devices, the functions may include joining the first zone and the second zone into a zone group in which the one or more first playback devices of the first zone and the one or more second playback devices of the second zone are configured to play back in synchrony.

In yet another aspect, a non-transitory computer readable memory is provided. The non-transitory computer readable memory has stored thereon instructions executable by a computing device to cause the computing device to perform functions. The functions may include initiating playback in a first zone of a media playback system, wherein the first zone comprises one or more first playback devices. After initiating playback in the first zone, the functions may include determining that the control device is within a threshold proximity to at least one of one or more second playback devices of a second zone of the media playback system. After determining that the control device is within the threshold proximity to at least one of one or more second playback devices, the functions may include joining the first zone and the second zone into a zone group in which the one or more first playback devices of the first zone and the one or more second playback devices of the second zone are configured to play back in synchrony.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A tangible, non-transitory computer-readable medium having stored therein instructions executable by one or more processors to cause a control device to perform functions comprising:
   sending, via a network interface, data representing instructions to initiate playback of audio content on one or more first playback devices of a media playback system;
   while the one or more first playback devices of the media playback system are playing back the audio content, determining that the control device is within a threshold proximity to one or more second playback devices of the media playback system, wherein the one or more first playback devices are outside of the threshold proximity;
   in response to determining that the control device is within the threshold proximity to the one or more second playback devices, displaying a prompt comprising a particular selectable control, the particular selectable control selectable to group the one or more first playback devices and the one or more second playback devices;
   detecting, via the displayed prompt, input data representing a selection of the particular selectable control; and
   in response to detecting the input data representing the selection of the particular selectable control, sending, via the network interface, data representing instructions to join the one or more first playback devices and the one or more second playback devices into a synchrony group configured to play back the audio content in synchrony.

2. The tangible, non-transitory computer-readable medium of claim 1, wherein sending the data representing instructions to join the one or more first playback devices and the one or more second playback devices into the synchrony group comprises:
   sending data representing instructions to remove the one or more first playback devices from the synchrony group after joining the one or more second playback devices into the synchrony group.

3. The tangible, non-transitory computer-readable medium of claim 1, wherein a first zone of the media playback system comprises the one or more first playback devices, wherein a second zone of the media playback system comprises the one or more second playback devices, and wherein displaying the prompt further comprises:
   displaying the prompt comprising an additional a third selectable control that, when selected, configures playback to switch to a nearby zone.

4. The tangible, non-transitory computer-readable medium of claim 1, wherein, prior to joining the one or more first playback devices and the one or more second playback devices into the synchrony group, the one or more first playback devices are in a pre-existing synchrony group with one or more third playback devices, and wherein sending the data representing the instructions to join the one or more first playback devices and the one or more second playback devices into the synchrony group comprises sending data representing instructions to join the one or more second playback devices into the pre-existing synchrony group with the one or more first playback devices and the one or more third playback devices.

5. The tangible, non-transitory computer-readable medium of claim 1, wherein a first zone of the media playback system comprises the one or more first playback devices, wherein a second zone of the media playback system comprises the one or more second playback devices, and wherein the functions further comprise:
   based on determining that the control device is within the threshold proximity to the one or more second playback devices, displaying an indication that a user of the control device is in proximity to the second zone.

6. The tangible, non-transitory computer-readable medium of claim 1, wherein determining that the control device is within the threshold proximity to the one or more second playback devices of the media playback system comprises:
   detecting a wireless signal emitted by the one or more second playback devices, wherein detection of the wireless signal indicates that the control device is within the threshold proximity.

7. The tangible, non-transitory computer-readable medium of claim 1, wherein determining that the control device is within the threshold proximity to the one or more second playback devices of the media playback system comprises:
   receiving, via the network interface, data indicating that the control device is within the threshold proximity to the one or more second playback devices.

8. A method to be performed by a control device, the method comprising:
   sending, via a network interface, data representing instructions to initiate playback of audio content on one or more first playback devices of a media playback system
   while the one or more first playback devices of the media playback system are playing back the audio content, determining that the control device is within a threshold proximity to one or more second playback devices of the media playback system, wherein the one or more first playback devices are outside of the threshold proximity;

in response to determining that the control device is within the threshold proximity to the one or more second playback devices, displaying a prompt comprising a particular selectable control, the particular selectable control selectable to group the one or more first playback devices and the one or more second playback devices;

detecting, via the displayed prompt, input data representing a selection of the particular selectable control; and in response to detecting the input data representing the selection of the particular selectable control, sending, via the network interface, data representing instructions to join the one or more first playback devices and the one or more second playback devices into a synchrony group configured to play back the audio content in synchrony.

9. The method of claim 8, wherein sending the data representing instructions to join the one or more first playback devices and the one or more second playback devices into the synchrony group comprises:

sending data representing instructions to remove the one or more first playback devices from the synchrony group after joining the one or more second playback devices into the synchrony group.

10. The method of claim 8, wherein a first zone of the media playback system comprises the one or more first playback devices, wherein a second zone of the media playback system comprises the one or more second playback devices, and wherein displaying the prompt further comprises:

displaying the prompt comprising an additional selectable control that, when selected, configures playback to switch to a nearby zone.

11. The method of claim 8, wherein, prior to joining the one or more first playback devices and the one or more second playback devices into the synchrony group, the one or more first playback devices are in a pre-existing synchrony group with one or more third playback devices, and wherein sending the data representing the instructions to join the one or more first playback devices and the one or more second playback devices into the synchrony group comprises sending data representing instructions to join the one or more second playback devices into the pre-existing synchrony group with the one or more first playback devices and the one or more third playback devices.

12. The method of claim 8, wherein a first zone of the media playback system comprises the one or more first playback devices, wherein a second zone of the media playback system comprises the one or more second playback devices, and wherein the method further comprises:

based on determining that the control device is within the threshold proximity to the one or more second playback devices, displaying an indication that a user of the control device is in proximity to the second zone.

13. The method of claim 8, wherein determining that the control device is within the threshold proximity to the one or more second playback devices of the media playback system comprises:

detecting a wireless signal emitted by the one or more second playback devices, wherein detection of the wireless signal indicates that the control device is within the threshold proximity.

14. The method of claim 8, wherein determining that the control device is within the threshold proximity to the one or more second playback devices of the media playback system comprises:

receiving, via the network interface, data indicating that the control device is within the threshold proximity to the one or more second playback devices.

15. A system comprising:
at least one processor;
at least one non-transitory computer-readable medium comprising instructions that are executable by the at least one processor such that the system is configured to perform functions comprising:

causing one or more first playback devices of a media playback system to initiate playback of audio content;

while the one or more first playback devices of the media playback system are playing back the audio content, determining that a user is within a threshold proximity to at one or more second playback devices of the media playback system, wherein the one or more first playback devices are outside of the threshold proximity;

in response to determining that the user is within the threshold proximity to the one or more second playback devices, displaying a prompt comprising a particular selectable control, the particular selectable control selectable to group the one or more first playback devices and the one or more second playback devices;

detecting, via the displayed prompt, input data representing a selection of the particular selectable control; and in response to detecting the input data representing the selection of the particular selectable control, sending, via a network interface, data representing instructions to join the one or more first playback devices and the one or more second playback devices into a synchrony group configured to play back the audio content in synchrony.

16. The system of claim 15, wherein sending the data representing instructions to join the one or more first playback devices and the one or more second playback devices into the synchrony group comprises:

sending data representing instructions to remove the one or more first playback devices from the synchrony group after joining the one or more second playback devices into the synchrony group.

17. The system of claim 15, wherein the system comprises a control device, wherein a first zone of the media playback system comprises the one or more first playback devices, wherein a second zone of the media playback system comprises the one or more second playback devices, and wherein displaying the prompt further comprises:

displaying the prompt comprising an additional a third selectable control that, when selected, configures playback to switch to a nearby zone.

18. The system of claim 15, wherein, prior to joining the one or more first playback devices and the one or more second playback devices into the synchrony group, the one or more first playback devices are in a pre-existing synchrony group with one or more third playback devices, and wherein sending the data representing the instructions to join the one or more first playback devices and the one or more second playback devices into the synchrony group comprises sending data representing instructions to join the one or more second playback devices into the pre-existing synchrony group with the one or more first playback devices and the one or more third playback devices.

19. The system of claim 15, wherein a first zone of the media playback system comprises the one or more first playback devices, wherein a second zone of the media playback system comprises the one or more second playback devices, and wherein the functions further comprise:
    based on determining that the user is within the threshold proximity to the one or more second playback devices, displaying an indication that the user is in proximity to the second zone.

20. The system of claim 15, wherein determining that the user is within the threshold proximity to the one or more second playback devices of the media playback system comprises:
    detecting, via a control device, a wireless signal emitted by the one or more second playback devices, wherein detection of the wireless signal indicates that the control device is within the threshold proximity.

\* \* \* \* \*

UNITED STATES PATENT AND TRADEMARK OFFICE
CERTIFICATE OF CORRECTION

PATENT NO. : 11,775,160 B2
APPLICATION NO. : 16/819737
DATED : October 3, 2023
INVENTOR(S) : Paul Andrew Bates It is certified that error appears in the above-identified patent and that said Letters Patent is hereby corrected as shown below:

In the Claims

In Column 30, in Claim 3, Line 15, after "additional" delete "a third".

In Column 32, in Claim 17, Line 55, after "additional" delete "a third".

Signed and Sealed this
Fifth Day of December, 2023

Katherine Kelly Vidal
*Director of the United States Patent and Trademark Office*